(12) United States Patent
Sato et al.

(10) Patent No.: US 6,225,986 B1
(45) Date of Patent: May 1, 2001

(54) COORDINATE INPUT APPARATUS AND ITS CONTROL METHOD

(75) Inventors: Hajime Sato, Yokohama; Atsushi Tanaka, Yamato; Yuichiro Yoshimura, Kamakura; Ryozo Yanagisawa, Inzai; Katsuyuki Kobayashi, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/000,814

(22) Filed: Dec. 30, 1997

(30) Foreign Application Priority Data

| Jan. 6, 1997 | (JP) | 9-000019 |
| Mar. 7, 1997 | (JP) | 9-053140 |
| May 9, 1997 | (JP) | 9-119867 |

(51) Int. Cl.$^7$ .................................................. G09G 5/00
(52) U.S. Cl. ....................... 345/178; 345/173; 345/177
(58) Field of Search ................................ 345/173, 177, 345/178; 178/18–20

(56) References Cited

U.S. PATENT DOCUMENTS

| 4,910,363 | * | 3/1990 | Kobayashi et al. | 178/18.04 |
| 4,980,518 | * | 12/1990 | Kobayashi et al. | 178/18.04 |
| 5,017,913 | * | 5/1991 | Kaneko et al. | 345/177 |
| 5,097,102 | * | 3/1992 | Yoshimura et al. | 345/178 |
| 5,308,936 |   | 5/1994 | Biggs et al. | 178/18 |
| 5,352,856 |   | 10/1994 | Tanaka et al. | 178/18 |
| 5,362,930 |   | 11/1994 | Yoshimura et al. | 178/18 |
| 5,484,967 | * | 1/1996 | Yanagisawa et al. | 178/18.04 |
| 5,539,160 |   | 7/1996 | Tokioka et al. | 128/19 |
| 5,684,277 | * | 11/1997 | Tokioka et al. | 178/18.04 |
| 5,750,941 | * | 5/1998 | Ishikawa et al. | 178/19 |
| 5,760,346 | * | 6/1998 | Kobayashi et al. | 178/18.04 |

FOREIGN PATENT DOCUMENTS

| 0 423 843 | 4/1991 | (EP) . |
| 0 694 864 | 1/1996 | (EP) . |
| 63-118826 | 5/1988 | (JP) . |
| 2-130617 | 5/1990 | (JP) . |
| 5-62771 | 3/1993 | (JP) | H05B/6/12 |
| 7-175580 | 7/1995 | (JP) . |

* cited by examiner

Primary Examiner—William A. Cuchlinski, Jr.
Assistant Examiner—Marthe Y. Marc-Coleman
(74) Attorney, Agent, or Firm—Fitzpatrick, Cella, Harper & Scinto

(57) ABSTRACT

A coordinate input apparatus having a stable and good input sense irrespective of different input conditions such as a vibration input position, a pen pressure and a pen angle. The coordinate input apparatus acquires an input coordinate in accordance with a delay time required for vibration input from a vibration input pen to a vibration propagation plate to reach a vibration sensor. A controller of the apparatus drives the vibration input pen at a first drive level. A window signal generator of the apparatus generates a window signal indicating that a significant signal was detected, when the level of an envelope detected from a signal supplied from the vibration sensor exceeds a detection threshold value. In accordance with the window signal, delay times tp and tg are acquired. A level discriminator of the apparatus judges whether the level of the envelope exceeds a discrimination threshold value. If it is judged that the level exceeds the discrimination threshold value, the controller drives the vibration input pen at a second drive level lower than the first drive level to acquire the delay times tp and tg.

42 Claims, 28 Drawing Sheets

COORDINATE INPUT APPARATUS AND ITS CONTROL METHOD

BACKGROUND OF THE INVENTION

1. Field of the Invention

The present invention relates to a coordinate input apparatus and its control method. More particularly, the invention relates to a coordinate input apparatus and its control method in which a vibration of an elastic wave input from a vibration input pen is detected with a plurality of sensors mounted on a vibration propagation plate, and in accordance with the propagation time of this elastic wave vibration, the coordinate of a vibration input point is detected.

2. Related Background Art

As disclosed in JP-B-5-62771, a coordinate input apparatus using ultrasonic waves calculates a coordinate value of an input position by detecting a delay time of a wave propagating on a tablet surface as an input plane. A coordinate input apparatus of this type is not necessary to form conductive wires in a matrix shape on a tablet so that the apparatus can be realized with a low cost. If a transparent plate glass is used as a tablet, a coordinate input apparatus having transparency higher than other coordinate detecting methods can be realized.

With the structure of a general coordinate input apparatus using ultrasonic waves, a plurality of vibration sensors for converting mechanical vibrations into electric signals, such as piezoelectric elements, are fixed to a vibration propagation plate, and a time from when vibrations are generated by a vibration input pen to when the vibration is detected with each vibration sensor is measured to calculate the vibration input position therefrom.

A signal detected with a vibration sensor is weak and not suitable for signal processing. Therefore, in general, this weak signal is amplified by a pre-amplifier. The gain of the pre-amplifier is set so that the maximum value of the weak signal amplified becomes lower than a power source voltage of a signal processing circuit.

In such a coordinate input apparatus using elastic waves, the level of a detection signal changes greatly with a vibration propagation distance, a pen pressure, a pen angle, a component variation and the like. A threshold value for signal detection is generally determined by considering a threshold value change amount to be caused by the above-described factors, an electromagnetic noise level, and a power source voltage.

However, if a coordinate input apparatus uses A0 lamb waves, unnecessary S0 wave vibrations are generated. The minimum level (threshold level) for detecting A0 waves is limited by the maximum level of such unnecessary vibrations.

The level of an S0 wave is generally about 3 to 9% of an A0 wave, and is very large as compared with an ordinary electromagnetic noise level. If the detection threshold level is set so that it cannot detect the S0 wave, the effective signal amplitude range of the A0 wave to be detected becomes very narrow. Therefore, the A0 wave may become difficult to exceed the detection level because of the above-described factors (vibration propagating distance, pen pressure, pen angle and the like). Accordingly, the problem of a difficulty of designating an input point and the problem of a poor input sense of a user.

The present invention has been made in consideration of the above problems and aims at providing a coordinate input apparatus and its control method capable of providing a stable and good input sense, irrespective of different input conditions such as a vibration input position, a pen pressure and a pen angle.

Further, with a conventional coordinate input apparatus, however, the amplitude of vibration detected with a vibration sensor changes with a vibration propagation path length from the vibration applying point of a vibration input pen to the vibration sensor on a vibration propagation plate, a load (writing pressure) of the vibration input pen, and an incident angle of vibration.

Therefore, the vibration level detected with the sensor on the vibration propagation plate changes and a stable detection may not be obtained. In order to solve this problem, it has been proposed for the calculation of a coordinate value to measure the detection levels of all sensors and set the amplification factor of an amplifier of each sensor in accordance with the detected level, or to set a drive voltage of a vibration input pen specific to each sensor and drive the vibration input pen at the set drive voltage. With this structure, however, the vibration input pen is required to be driven as many as twice the number of vibration sensors so that it is disadvantageous from the viewpoint of a consumption power and sampling rate.

The invention has been made in consideration of the above problem and aims at providing a coordinate input apparatus and its control method capable of detecting vibration at a stable signal level and detecting a coordinate value at high precision.

It is another object of the present invention to provide a coordinate input apparatus and its control method capable of setting a drive state of the apparatus in accordance with a designated point on an input plane and a distance of each sensor and capable of detecting vibration at a stable signal level at any position on the input plane.

It is a further object of the present invention to provide a coordinate input apparatus and its control method capable of reducing the number of driver circuits and the operation amount thereof and preventing an increase in a consumption power and a reduction of a sampling rate, by calculating a distance between a designated point on an input plane and each sensor and setting the drive state of the system.

Still further, with a conventional coordinate input apparatus, however, if there is any obstacle between a vibration input pen and a sensor, the detection level of the sensor lowers so that some problem occurs in a waveform detection process.

For example, in an ordinary input state of a user, the user sometimes designates an input point with the hand in touch with a vibration propagation plate. In this case, if the hand is on a path between a vibration input pen and a sensor, i.e., on a path along which vibration generated by the vibration input pen propagates toward the sensor, then the vibration amplitude attenuates and the detection level of the sensor lowers. Such a phenomenon appears not only when a hand is in touch with the vibration propagation plate but also when a substance is placed on the plate or stains are attached to the surface of the plate.

The signal processing circuit has been designed therefore by considering the attenuation of the detection level, so that a large power source voltage becomes necessary for retaining a proper dynamic range.

The present invention has been made in consideration of the above problem and aims at providing a coordinate input apparatus capable of stably detecting an input position and retaining a detection level even in a low voltage operation.

SUMMARY OF THE INVENTION

According to one aspect of the present invention, there is provided a coordinate input apparatus for obtaining an input position of vibration input from a vibration source to a vibration propagation plate in accordance with a delay time required for the vibration to reach vibration detecting means, the coordinate input apparatus comprising:

first driving means for driving the vibration source at a first drive level to generate a coordinate detection signal in accordance with a detection signal supplied from the vibration detecting means;

judging means for judging whether the detection signal detected with the vibration detecting means is larger than a first threshold value; and second driving means for driving the vibration source at a second drive level lower than the first drive level to generate the coordinate detection signal in accordance with the detection signal supplied from the vibration detecting means, if it is judged that the first detection signal is larger than the first threshold value.

DETAILED DESCRIPTION OF THE PREFERRED EMBODIMENTS (First Embodiment)

Figure 1:
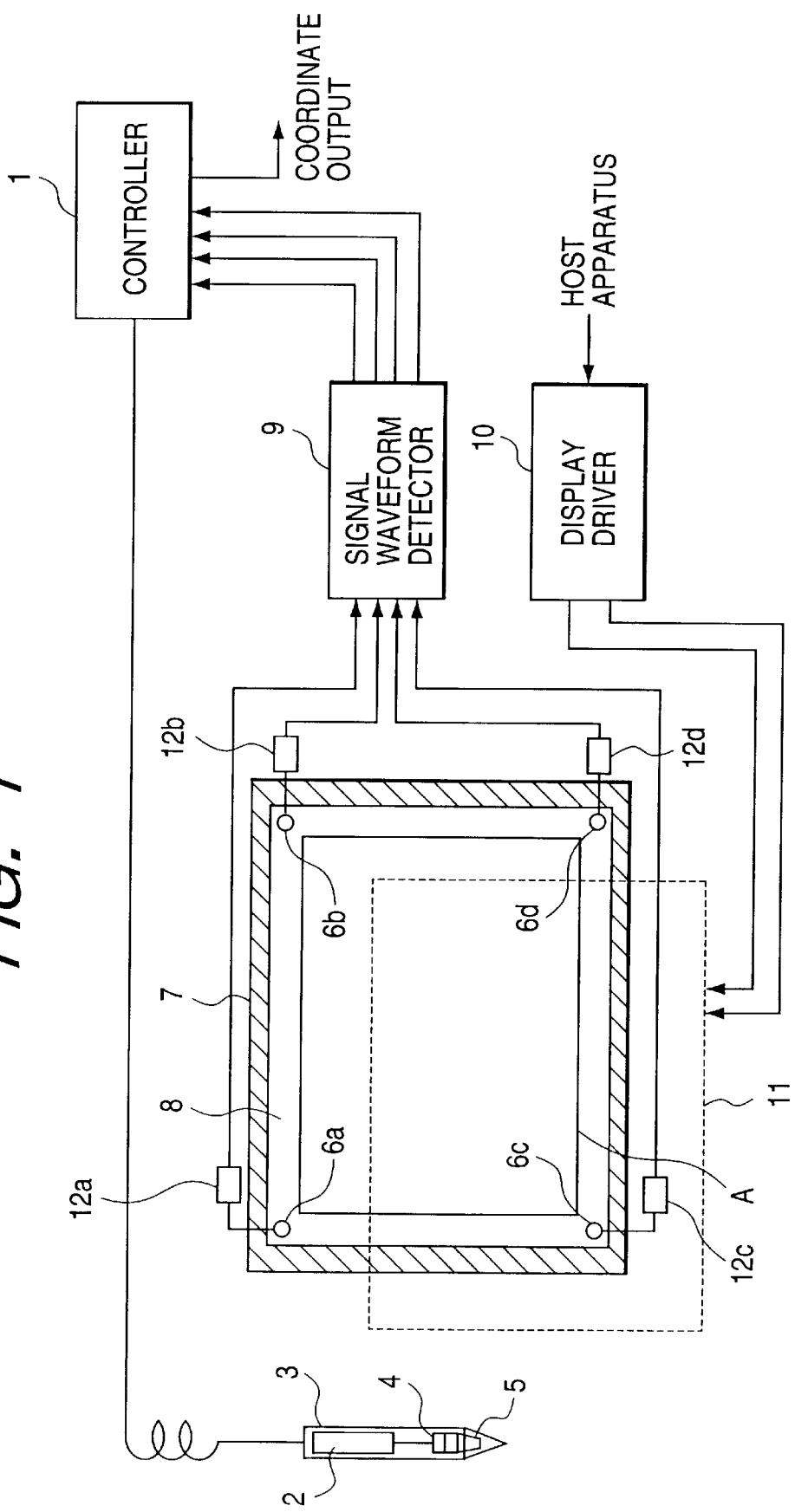
FIG. 1 is a block diagram showing the structure of a coordinate input apparatus according to a first embodiment of the invention.

FIG. 1 is a block diagram showing the structure of a coordinate input apparatus according to the first embodiment of the invention. In FIG. 1, reference numeral 1 represents a controller for controlling the whole system and calculating a coordinate position. Reference numeral 2 represents a vibrator driver which is built in a vibration input pen 3 and drives a vibrator (piezoelectric element such as PZT) mounted in the pen 3 by a pen drive signal supplied from the controller 1. Vibration generated by the vibrator 4 propagates via a horn to a pen tip 5. Reference numeral 8 represents a vibration propagation plate made of transparent material such as glass. A coordinate input is performed by touching the vibration propagation plate 8 with the vibration input pen 3. This coordinate input is practically performed by touching with the vibration input pen 3 a desired point in an area (effective area) indicated by a solid line A in FIG. 1.

A vibration absorber 7 is provided at the periphery of the vibration propagation plate 8 in order to absorb vibration or prevent vibration from being reflected at the periphery and returned back to the center of the plate. Vibration sensors 6a to 6d are fixed to the corners of the vibration propagation plate 8, the sensors converting mechanical vibration generated by a piezoelectric element or the like into electrical signals.

Vibrations detected with the sensors 6a to 6d are amplified by pre-amplifiers 12a to 12d and input to a signal waveform detector 9. Reference numeral 11 represents a display such as a liquid crystal display which is mounted at the back of the vibration propagation plate 8. The controller 1 supplies the coordinate value designated by the vibration input pen 3 to a host apparatus (not shown) such as a personal computer which in turn drives a display driver 10 in accordance with the coordinate value to display the coordinate point as if it is written on a paper sheet with a real pen.

The vibration frequency of the vibrator 4 is set so that a lamb wave can be generated on the vibration propagation plate 8. Therefore, elastic waves propagating on the vibration propagation plate 8 are lamb waves which are advantageous in that the influence of scratches, obstacles or the like on the vibration propagation plate 8 is less as compared with surface waves.

The controller 1 acquires a coordinate value at a predetermined interval (e.g., 10 ms) and supplies it to the host apparatus. In this operation, the sensors are sequentially selected and a delay time of an elastic wave to each sensor is detected. The propagation delay time includes a group delay time tg of the group velocity of a lamb wave and a phase delay time tp of a phase velocity. In accordance with both the delay times, a distance between the input pen and each sensor is calculated.

Figure 2:
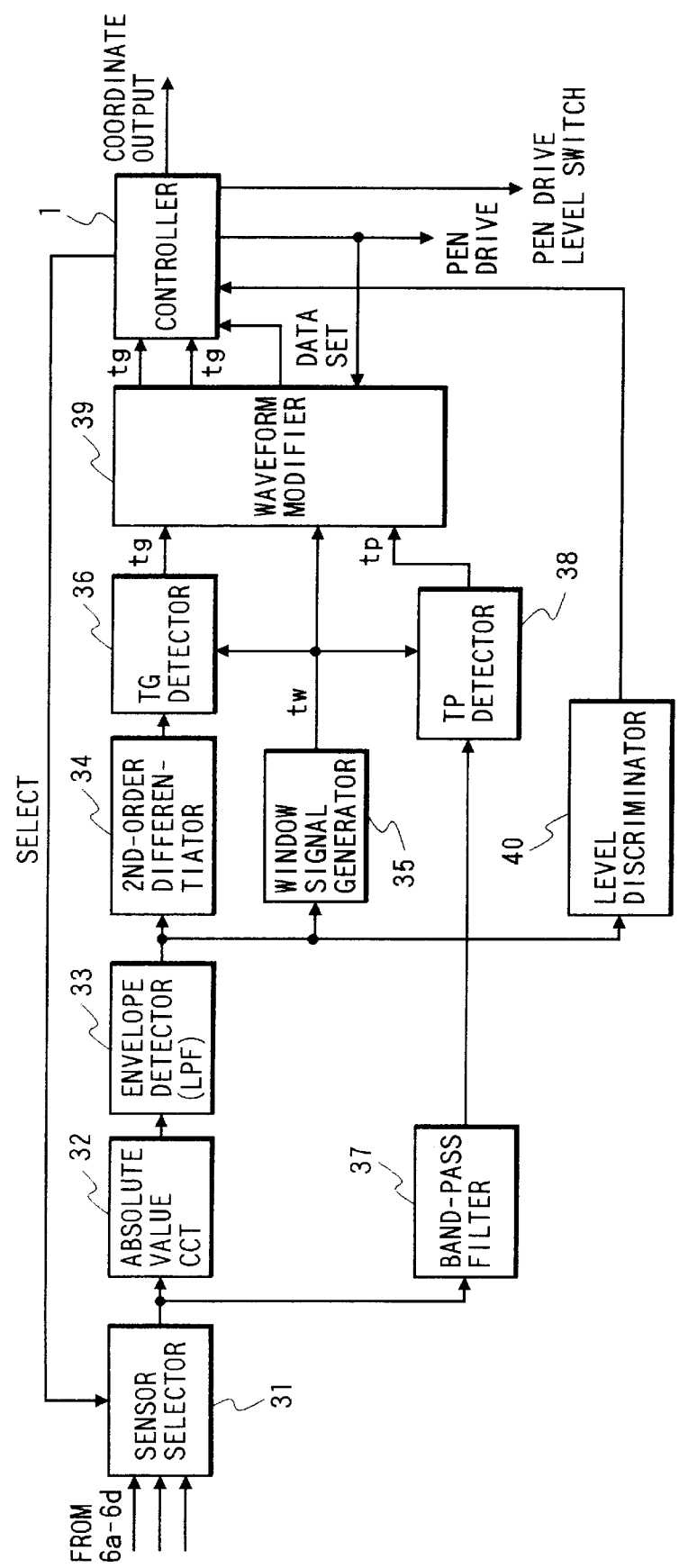
FIG. 2 is a block diagram showing the structure of a signal waveform detector shown in FIG. 1.
Figure 3:
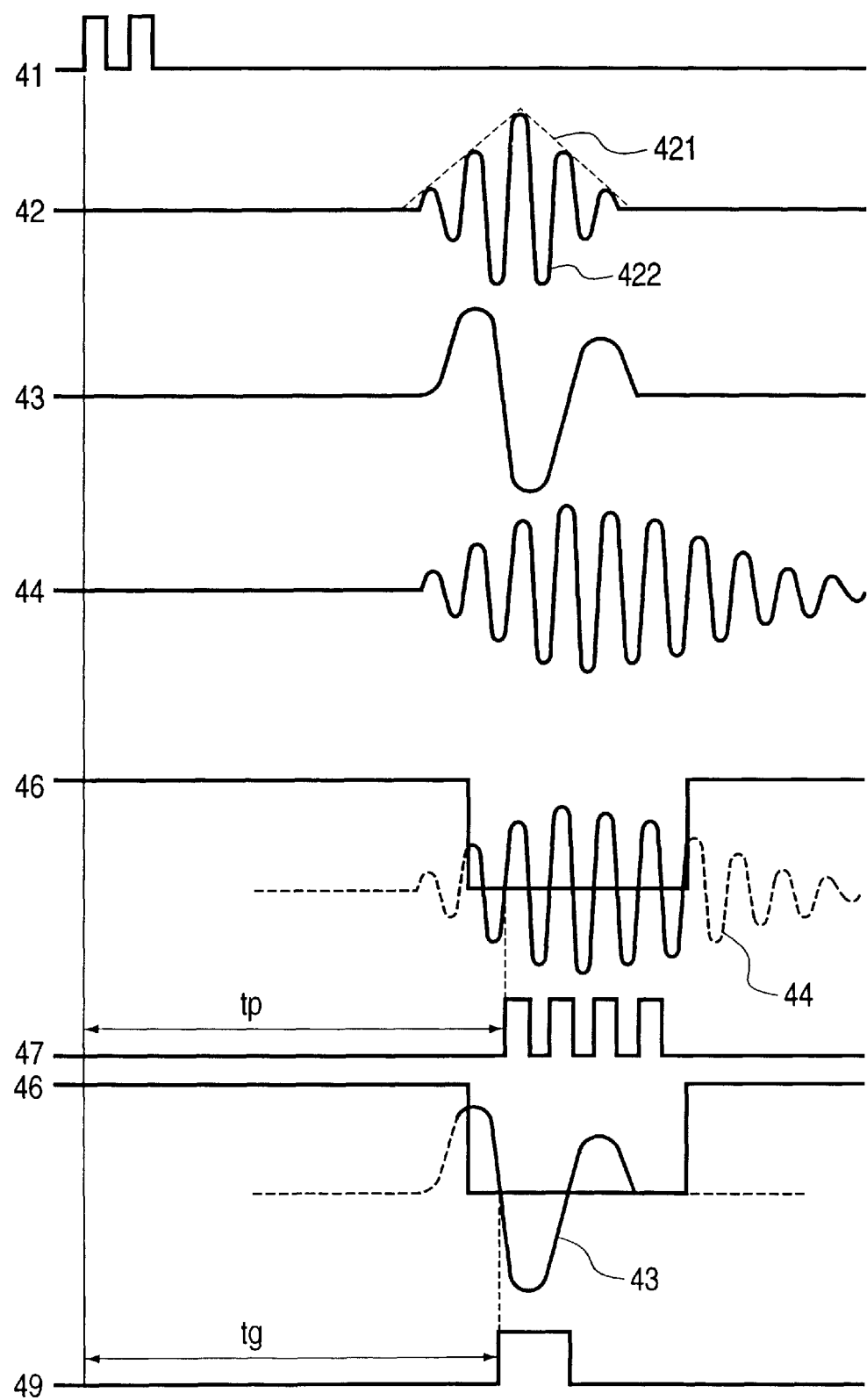
FIG. 3 is a diagram illustrating signal processing according to the first embodiment.

FIG. 2 is a block diagram showing the structure of the signal waveform detector 9. FIG. 3 is a diagram illustrating signal processing according to the first embodiment.

In the delay time measurement, the controller 1 first outputs a sensor select signal to a sensor selector 31 to select one sensor. Next, the controller 1 outputs a pen drive signal and makes its internal timer (counter) count time.

Output signals from the vibration sensors 6a to 6d are amplified to a predetermined level (signal 42) by the pre-amplifiers 12a to 12d. The amplified signal is selected by the sensor selector 31 and input to an absolute value circuit 32 and a band-pass filter 37. The signal input to the absolute value circuit is input to an envelope detector 33 made of a low-pass filter and the like to derive only an envelope (signal 421) from the input signal. This envelope signal is input to a second-order differentiator 34, a window signal generator 35 for generating a detection window signal tw, and to a level discriminator 40.

The window signal generator 35 serves also as a circuit for signal detection judgement, and is made of a comparator with a detection threshold value (to be described later) being set. If the input envelope signal (signal 421) is larger than the detection threshold value, the window signal generator 35 outputs a detection window signal tw (signal 46). By using this detection window signal tw as an enable signal, a Tg detector 36 made of a comparator passes a portion of a signal 43 supplied from the second-order differentiator 34 to generate a tg signal (signal 49) which is input to a waveform modifier 39.

A signal (signal 44) output from the band-pass filter 37 is supplied to a Tp detector 38 which generates a tp signal (signal 47) in accordance with the detection window signal (signal 46). The tp signal is input to the waveform modifier 39.

The waveform modifier 39 shapes the input tg and tp signals and supplies them representative of a wave arrival timing to the controller 1. The controller 1 measures the time width of the pulse signal by its internal counter and calculates a distance by a method to be later described. In order to allow a CPU to detect a time, the waveform modifier 39 generates a pulse having a long duration from when the pen drive signal 41 is output to when the tp and tg signals are detected. Namely, the tp and tg signals input to the waveform modifier 39 and the tp and tg signals output therefrom have the same time information and different waveforms.

The envelope signal is also input to the level discriminator 40 which is set with a discrimination threshold value (to be later described) and detects whether the input signal is larger than a predetermined level. The discrimination result by the level discriminator 40 is input as a discrimination signal to the controller 1. In accordance with this discrimination signal, the controller 1 changes a drive level (high or low level) of the pen 3.

Figure 4:
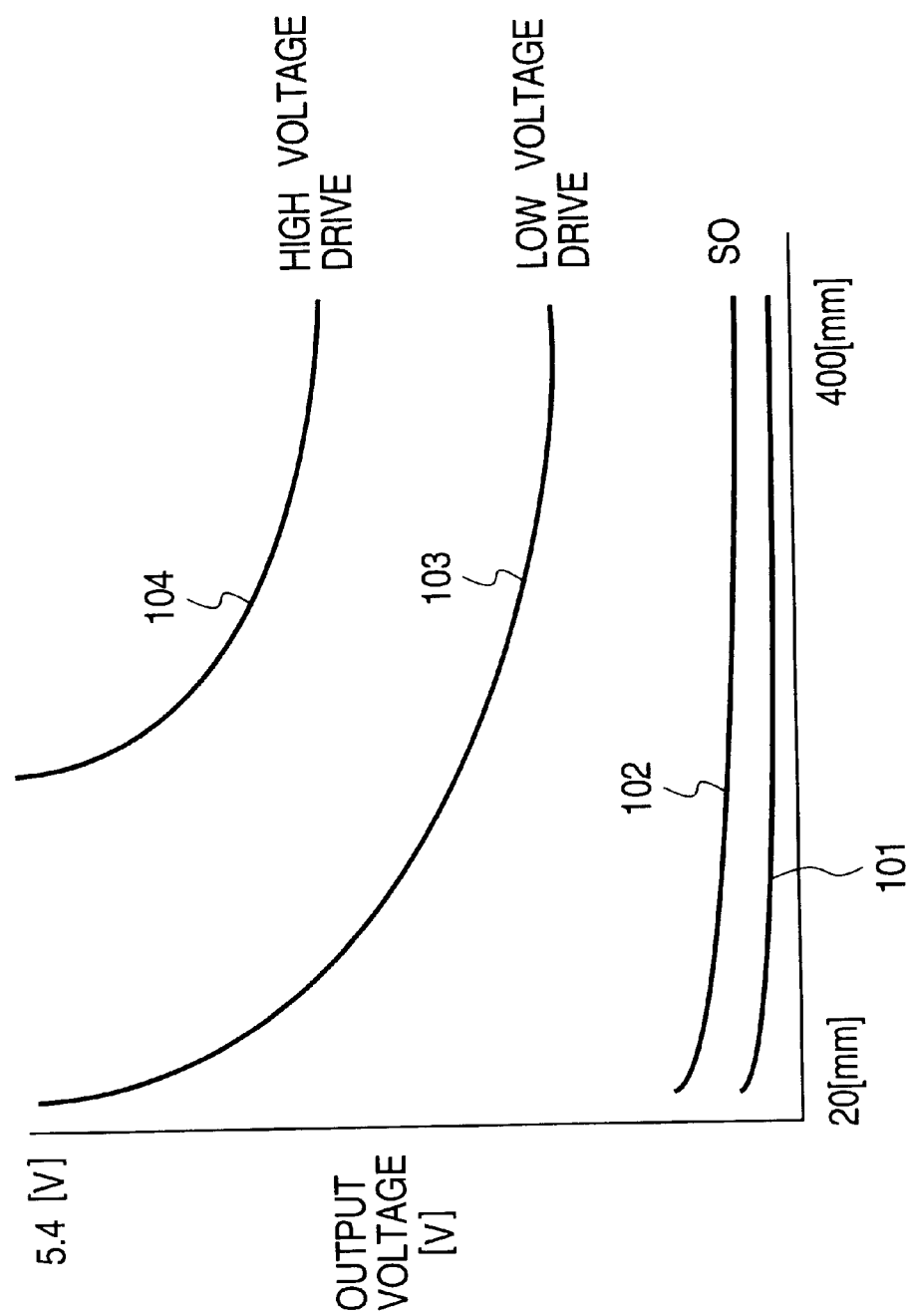
FIG. 4 is a diagram illustrating detection threshold values according to the first embodiment.

Next, the detection threshold value used by the window signal generator 35 and the discrimination threshold value used by the level discriminator 40 will be described. FIG. 4 is a diagram illustrating the detection threshold value according to the first embodiment.

A signal detection level is set to a level represented by a curve 101 shown in FIG. 4, in accordance with the pen pressure, pen angle and the like. If a detection signal is larger than this level, it is judged that a signal is detected and the signal arrival delay time is measured. Specifically, if the window signal generator 35 judges that the input envelope signal 421 is larger than this detection threshold value, then the tg and tp signals are detected. The threshold value (curve 101, hereinafter called a detection threshold value level 101) of the detection level is set to a value represented by a curve which attenuates with a distance (i.e., time). It is sufficient that the detection threshold value is set equal to or higher than the maximum level of S0 at a low voltage drive (obviously higher than a noise level). This detection threshold level is preferably set as low as possible because a low voltage (low level) becomes easy to input. The abscissa of FIG. 4 may be converted into time. Since the time tp is not continuous, this time tp is difficult to be converted simply from the distance. However, the time tg can be easily converted from the distance. The time corresponding to the abscissa of FIG. 4 is several tens $\mu$s to 200 $\mu$s because a group velocity Vg is about 200 m/s although it changes with the apparatus configurations such as a frequency and a plate thickness.

Consider that the detection level of unnecessary vibrations S0 rises at the maximum to a level indicated by a curve 102 while the pen drive signal level is set to a power source voltage (high voltage drive), when the conditions such as pen angle, temperature, apparatus location, pen pressure and the like change. In this case, since the detection level of unnecessary vibrations is larger than the detection threshold value level 101, a signal of essential vibrations is not detected, but an erroneous signal is detected.

In order to avoid erroneous signal detection, in this embodiment, the discrimination threshold value determined from an A0/S0 ratio is used. If the detection signal level is larger than the discrimination threshold value, the pen 3 is driven by a lower drive signal level (low voltage drive).

A high level drive is first performed to judge signal detection, basing upon whether the detection signal is larger than the detection threshold value. If larger, then it is judged the detection signal is larger than the discrimination threshold value.

The discrimination threshold value is set relative to the A0 level when the maximum S0 level larger than the detection threshold level is generated. Although the S0/A0 ratio changes with the apparatus configurations, it is about 3 to 9%. Therefore, the discrimination threshold value is set to the A0 level determined by this ratio relative to the maximum S0 level at each distance. If the A0 level of the detection signal is larger than the discrimination threshold value, the unnecessary vibrations are possibly larger than the detection threshold value and the unnecessary vibrations S0 are possibly detected erroneously. Therefore, if the detection signal level exceeds the discrimination threshold value, the drive level of the pen 3 is lowered to drive it again. For example, if it is driven at a level lower by 6 dB than the high drive level and a ratio of the maximum S0 level to the detection threshold value is equal to or smaller than 6 dB, then the S0 level is equal to or lower than the detection threshold value. The S0/A0 ratio changes with the apparatus configurations (propagation plate thickness, material, detection method and the like). If the configurations are determined, the discrimination threshold value is determined from the maximum predictive S0/A0 ratio of the apparatus.

If the envelop signal 421 obtained when the pen 3 is driven again at a low level exceeds the detection level and does not exceed the discrimination threshold value, then it is possible to normally detect the A0 vibration.

If the dynamic range of a signal is broadened in the range of a power source voltage, the influence of noises is suppressed. As shown in FIG. 4, at the low level drive, the upper limit level of a signal output from the pre-amplifier is set so that it becomes maximum at the shortest distance between the pen and a sensor (curve 103). In this case, the signal level at the high level drive may enter the saturated region of the power source voltage. However, in this case, the drive level is changed to the low level to detect the signal again.

Since the unnecessary vibration S0 is determined at the high level drive, the discrimination threshold value is determined from the maximum S0 value at the high level drive multiplied by the S0/A0 ratio. However, in this case, there is a saturated region of the A0 vibration at the high level drive, and the setting of the threshold value becomes unstable. It is therefore preferable to set the judgement threshold value lower by a ratio of the low level to the high level (in this embodiment, −6 dB).

In this embodiment, the judgement threshold value and discrimination threshold value used by the window signal generator 35 and level discriminator 40 change as shown in FIG. 4 relative to the time lapse after the vibration input pen 3 is driven. In this embodiment, therefore, CPU of the controller 1 sets the judgement threshold value and discrimination threshold value to the window signal generator 35 and level discriminator 40 (In FIG. 2, these signal lines from the controller are omitted).

Figure 9:
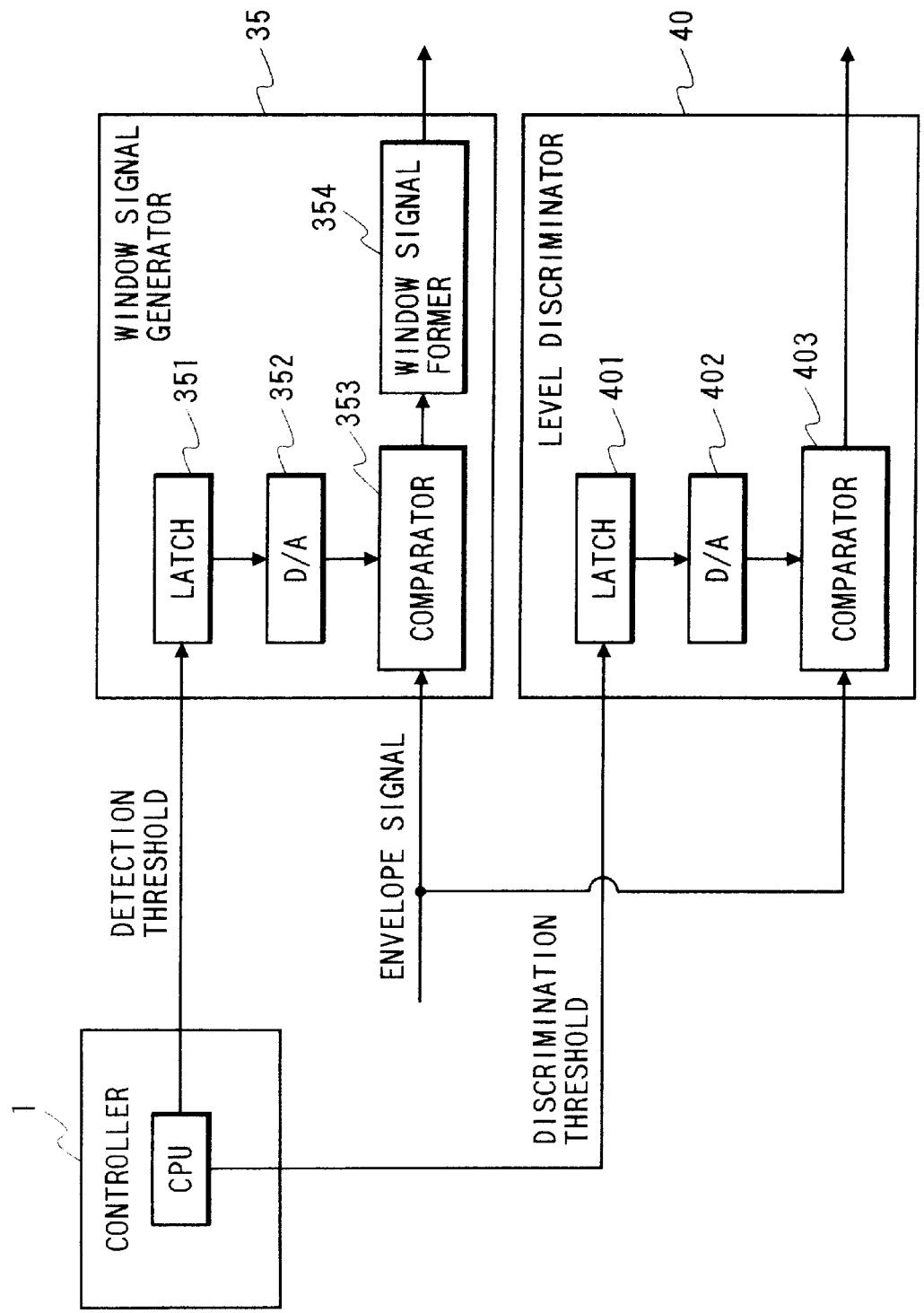
FIG. 9 is a diagram showing the circuit structure for a controller to set a threshold value.

FIG. 9 is a diagram illustrating threshold value setting by the controller 1. CPU of the controller 1 outputs the judgement threshold value 101 shown in FIG. 1 to the window signal generator 35 while the time lapses after the pen drive signal is output. A latch 351 of the window signal generator 35 latches this judgement threshold value and outputs it to a D/A converter 352 which converts the judgement threshold value into a voltage value and supplies it to a comparator 353. The comparator 353 compares the envelop signal with the voltage value supplied from the D/A converter 352, and outputs the comparison result to a window signal former 354 which outputs the window signal tw in accordance with the comparison result.

The level discriminator 40 has the structure similar to the window signal generator 35. A latch 401 latches the discrimination threshold value sent from CPU and a D/A converter 402 converts it into a voltage value. A comparator 403 compares the envelope signal with the voltage value supplied from the D/A converter 402, and outputs the comparison result as a level discrimination signal. In order to change the threshold value with a distance (time), a CR charge/discharge may be provided in the window signal generator 35 and level discriminator 40 shown in FIG. 2.

Figure 5:
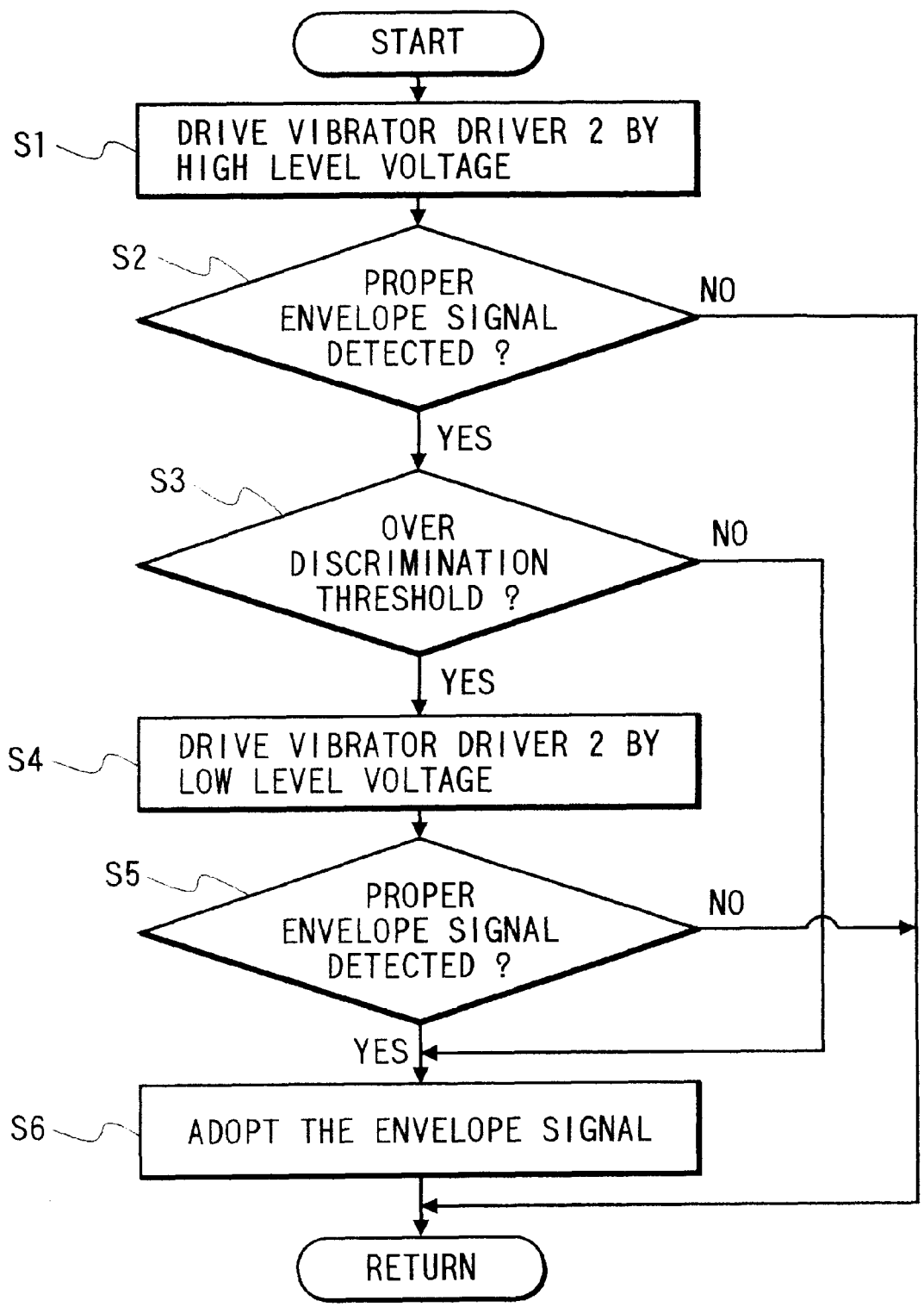
FIG. 5 is a flow chart illustrating the sequence of a coordinate detection process according to the first embodiment.

FIG. 5 is a flow chart illustrating a coordinate detection process according to the first embodiment. A control program realizing the control sequence to be described below is stored, for example, in a ROM (not shown) of the controller 1 and executed by a CPU (not shown).

First, at Step S1, the vibrator driver 2 of the vibration input pen 3 is driven at a high level. Thereafter, at Step S2 it is judged whether an envelope signal larger than the judgement threshold value is detected. If not, it is judged as a pen-up and returns to the main process without performing any operation. If an envelope signal larger than the judgement threshold value is detected, it is checked at Step S3 whether the level exceeds the discrimination threshold value. If not, the flow advances to Step S6 whereat the detection signal is used to obtain the tp and tg signals.

If it is judged at Step S3 that the detection signal level exceeds the discrimination threshold value, the flow advances to Step S4 whereat the vibrator driver 2 of the vibration input pen 3 is driven at a low level. At Step S5 if the detection signal level exceeds the judgement threshold value, the flow advances to Step S6 whereat the detection signal is used to obtain the tp and tg signals. If the detection signal level does not exceed the judgement threshold value, it is judged as a pen-up to return to the main process.

In the operation illustrated by the flow chart, a level discrimination whether the detection signal level at the low level drive exceeds the discrimination threshold value is not performed, because there is no such judgement combination from the viewpoint of design (a detection signal at a low level drive does not exceed the discrimination threshold value). However, if there is a fear of erroneous operations of the apparatus, the level discrimination at the low level drive may be performed, and if the detection signal exceeds the discrimination threshold value, it is judged that the apparatus is abnormal and a user may be informed of such an effect.

Figure 6:
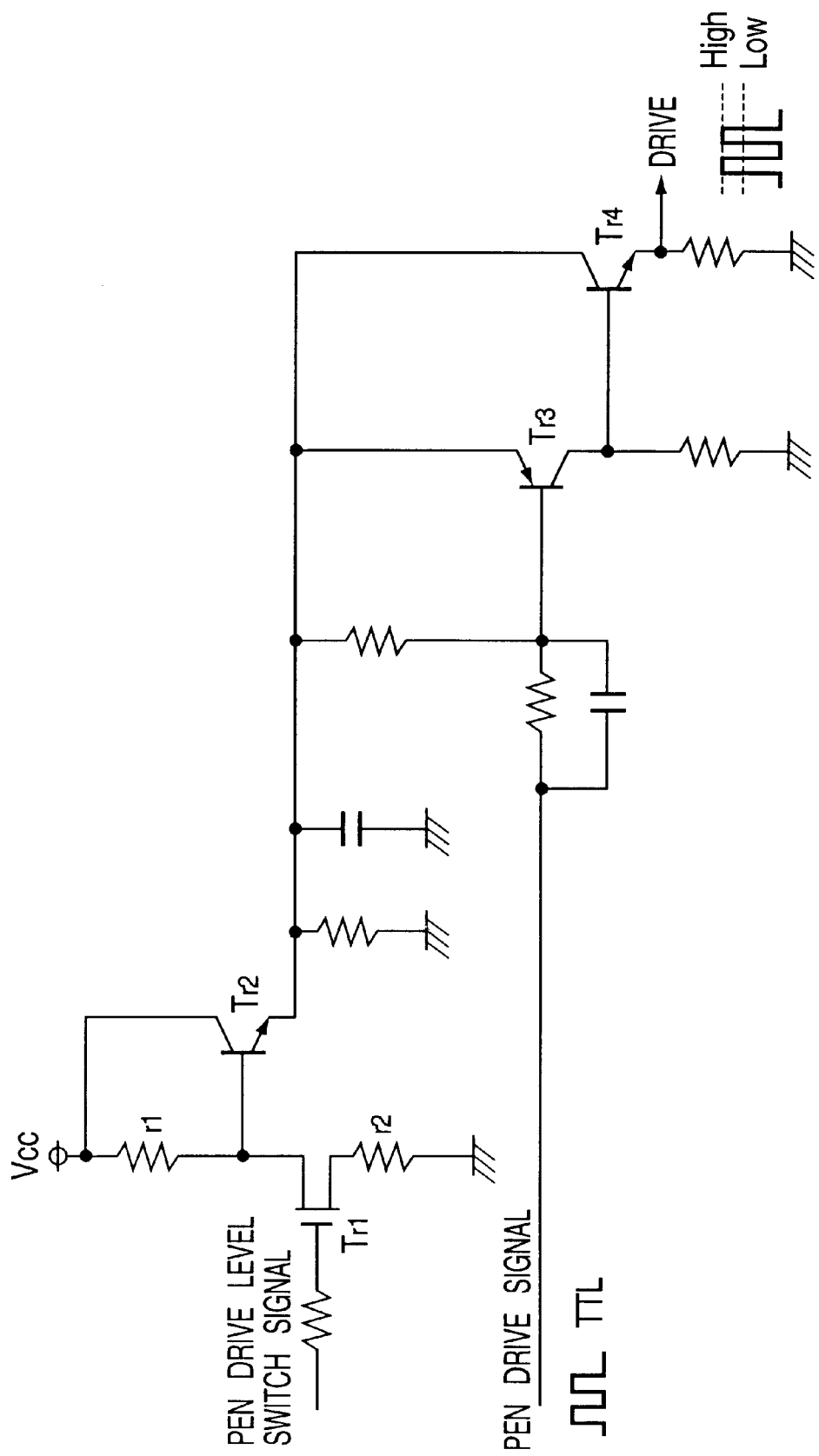
FIG. 6 is a diagram showing an example of the structure of a pen driver capable of changing a pen drive level.

If the signal level exceeds the judgement threshold value, a pen drive level switch signal is generated to change the pen drive level to the low drive level and the pen is driven again at Step S4. A circuit for switching between pen drive levels will be described. FIG. 6 shows an example of the structure of a pen driver capable of switching between pen drive levels.

A pen drive level switch signal is supplied from the controller 1. In accordance with the level of this signal, a transistor Tr1 is turned on or off. If the transistor Tr1 is off, the power source voltage is applied to vibrator driving transistors Tr3 and Tr4 (high level drive). If the transistor Tr1 is on, the transistor Tr2 is supplied with a voltage determined by resistors r1 and r2 (low level drive), and this voltage is applied to the vibrator driving transistors Tr3 and Tr4. After the drive level is determined by the pen drive level switch signal in the above manner, the pen drive signal is supplied to drive the vibrator at a desired drive level.

The above operations are performed for each sensor to calculate a distance from the pen to each sensor.

By using the tg and tp signals detected at Step S6, a distance between an input point and each sensor is calculated and the input coordinate value is calculated by using this distance. The sequence of calculating a coordinate value will be briefly described below.

An ultrasonic vibration is generated by the vibration input pen 3, propagated along the vibration propagation plate 8 to the vibration sensor 6a in the time tg, and detected by this sensor 6a. A signal 42 detected by the sensor has the waveform as shown in FIG. 3. In this embodiment, vibration is a lamb wave so that the relationship between the envelope 421 and phase 422 of the detection signal relative to the propagation distance on the vibration propagation plate 8 changes with this distance during the vibration propagation. It is possible to precisely detect the distance between the vibration input pen 3 and vibration sensor 6a in accordance with the group velocity Vg and phase velocity Vp.

When the envelope 421 only is taken into consideration, its velocity is Vg. As a particular point or inflection point on the waveform or a peak of the waveform of, for example, the signal 43 shown in FIG. 3, is detected, the distance between the vibration input pen 3 and vibration sensor 6a is given by:

$$d = Vg \cdot tg \qquad (1)$$

where tg is the vibration propagating time. In this embodiment, the particular point on the waveform of the envelope 421 is set to the first zero cross point of the second-order differentiated signal 43 in the window of the window signal.

The distance between the vibration input pen 3 and vibration sensor 6a is therefore given by:

$$d = n \cdot \lambda p + Vp \cdot tp \qquad (2)$$

where tp (signal 47) is a time required for vibration to reach a particular detection point on the phase waveform signal 42, i.e., the first zero cross point in the window of the window signal 46, $\lambda p$ is a wavelength of an elastic wave, and n is an integer.

From the equations (1) and (2), the integer n is given by:

$$n = [(Vg \cdot tg - Vp \cdot tp)/\lambda p + 1/N] \qquad (3)$$

where N is a real number excepting "0" and takes a proper value. The value of n obtained from the equation (3) is substituted in the equation (2) so that the distance between the vibration input pen 3 and vibration sensor 6a can be calculated precisely.

Figure 7:
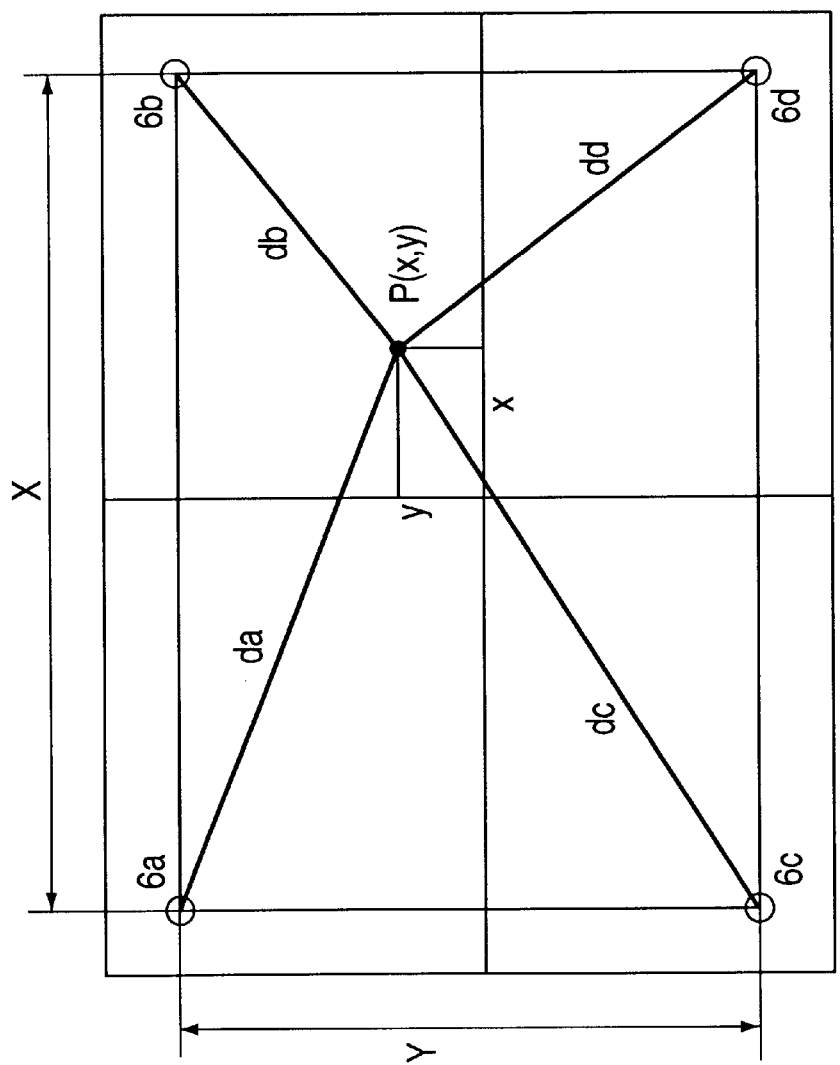
FIG. 7 is a diagram illustrating a method of calculating a coordinate value of a vibration input point in accordance with a distance between the vibration input point and each vibration sensor.

FIG. 7 is a diagram illustrating a method of calculating the coordinate value of a vibration input point in accordance with the distance between the vibration input point to each sensor. The coordinate value (x, y) of the position P of the vibration input pen 3 is given by the following equations by using distances da to dd and the pythagorean theorem.

$$x = (da + db) \cdot (da - db)/2X \qquad (4)$$

or $$x = (dc + dd) \cdot (dc - dd)/2X \qquad (5)$$

$$y = (da + dc) \cdot (da - dc)/2Y \qquad (6)$$

or $$y = (db + dd) \cdot (db - dd)/2Y \qquad (7)$$

where X and Y are the distance between vibration sensors 6a and 6b and the distance between vibration sensors 6c and 6d. In the above manner, the position coordinate of the vibration input pen 3 can be detected in real time.

As described above, according to the first embodiment, the dynamic range of a detection signal is made large at the high level drive so that the signal can be detected stably even if the level is lowered by a pen pressure or a propagation distance. If there is a high possibility that unnecessary vibrations are detected at the high level drive, the drive level is changed to the low level so that erroneous signal detection can be avoided.

Namely, a possibility of erroneously detecting unnecessary vibrations is checked, and in accordance with this check, the drive level of the vibration input pen is changed so that a signal can be detected stably irrespective of different use conditions.

(Second Embodiment)

In the first embodiment, the pen is driven by a power source voltage (high level drive) or by a voltage lower by 6 dB than the high level (low level drive). The invention is not limited only to this method.

For example, it is obvious to those skilled in the art to modify the above embodiment structure by preparing a plurality of amplifier gains of the pre-amplifiers 12a to 12d for amplifying signals supplied from the vibration sensors, not by using the different drive levels as in the first embodiment.

If an input area is broad, the pen-sensor distance becomes long so that the A0 signal may have the noise level or near it. If the detection level is very small, an S/N ratio lowers and correct signal detection becomes difficult. In such cases, combinations of drive levels may be switched in accordance with the distance to thereby obtain the same advantages as the first embodiment.

Figure 8:
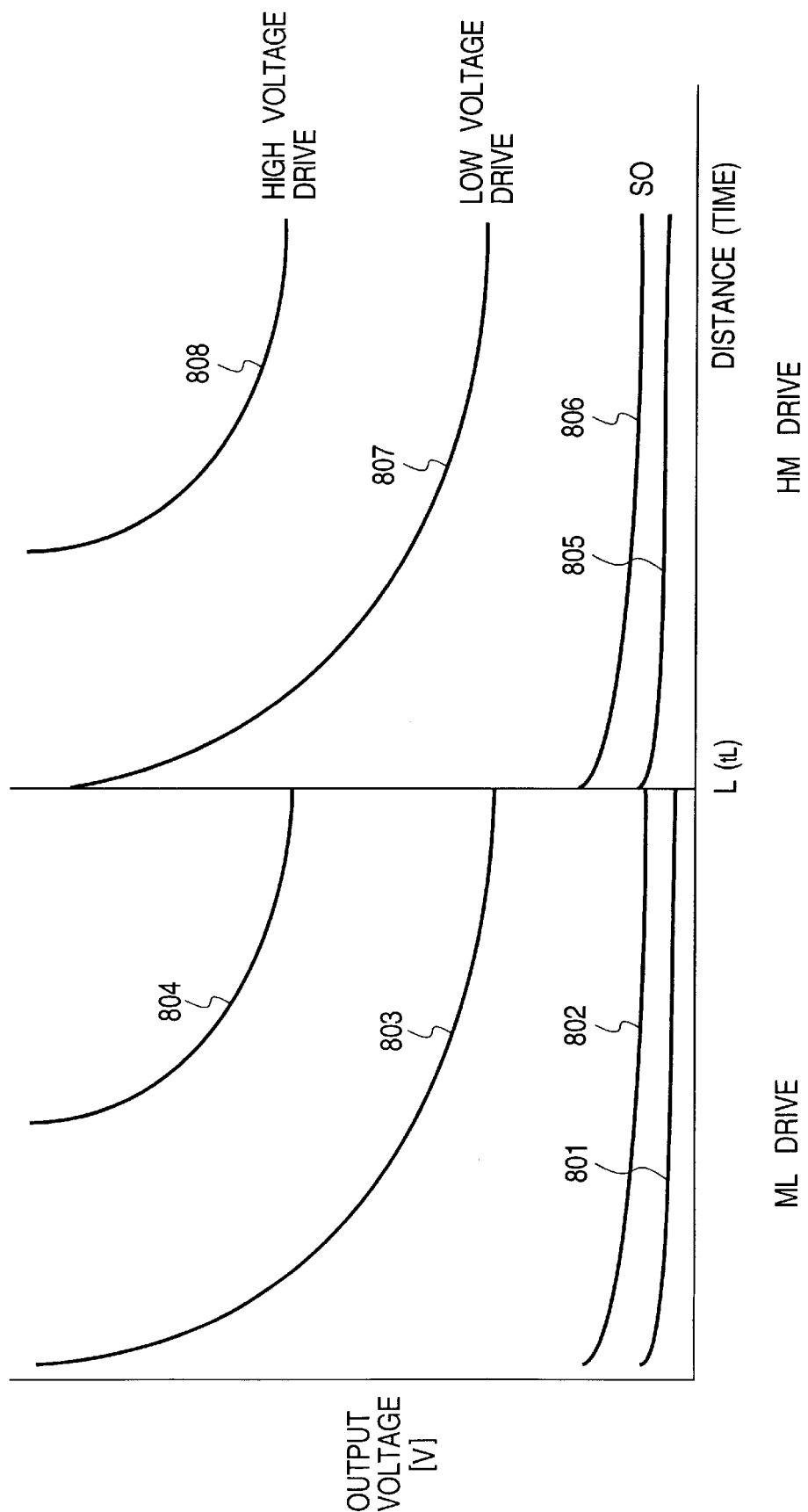
FIG. 8 is a diagram showing detection threshold values and signal levels when a combination of drive levels is changed with a detection distance (detection time).

FIG. 8 is a diagram showing judgement threshold values and signal levels wherein combinations of drive levels are switched in accordance with a detected distance (detected time). The propagation time at the distance L is tL. Before tL a combination of drive levels M and L is used to perform the operation same as the first embodiment, whereas after tL a combination of drive levels H and M is used to perform the operation same as the first embodiment.

Before tL, the pen is driven first at the drive level M (middle level). If a signal exceeding a judgement threshold value 801 is detected, this level is compared with a discrimination threshold value 803. If the signal level does not exceed the discrimination threshold value, the tg and tw values obtained by this signal are used, whereas if it exceeds, the drive level is changed to the drive level L (low level) to drive the pen again.

If the time becomes over tL, the measurement is once stopped at this time and thereafter, the pen is driven at the level H (high level). The detection signal is monitored whether it exceeds a judgement threshold value 805 and whether it exceeds a discrimination threshold value 807. If the signal exceeding the discrimination threshold value is detected, the pen is driven at the level M again.

By providing a plurality of combinations of drive levels in accordance with distances, it is possible to prevent the dynamic range to be lowered by unnecessary S0 vibrations, noises and the like and to provide a coordinate input apparatus having a good input sense.

As described above, according to the embodiments, a judgement threshold value is set to detect a signal from the vibration sensor, and the drive level of the vibration input pen is changed in accordance with whether the detection signal exceeds the discrimination threshold value. It is therefore possible to broaden an apparent dynamic range. Specifically, even a signal (A0) having a level lower than the level of an unnecessary signal (S0) presumably generated at the high level drive, can be detected. Even at a high level drive, if a pen pressure is weak or under other bad conditions, the A0 signal may become smaller than the maximum S0 signal. Even in such a case, since the judgement threshold value is set lower than the maximum S0 level, an A0 signal can be detected. On the other hand, if a pen pressure is high or under other conditions at the high level drive, the S0 signal level exceeds the judgement threshold value. However, in this case, the pen is driven at the low level so that the S0 level becomes equal to or lower than the judgement threshold value and the A0 signal can be detected. This is equivalent to that the dynamic range of the detection signal is apparently broadened. Accordingly, an A0 signal other than the unnecessary S0 signal can be detected, a low pen pressure can be used, and at the same time an allowable range of component variation can be broadened.

The present invention may be applied to a system constituted by a plurality of apparatuses (e.g., a host computer, interface units, a reader, a printer, and the like) or to a system constituted by a single apparatus (e.g., a copier or a fax).

The scope of the invention also includes a system or apparatus whose computer (CPU or MPU) runs to operate various devices connected thereto in accordance with software program codes supplied to the system or apparatus so as to realize the functions of the above first and second embodiments.

In this case, the software program codes themselves realize the functions of the first and second embodiments. Therefore, the program code themselves and means for supplying such program codes to a computer, e.g., a storage medium storing such program codes, constitute the present invention.

A storage medium storing such program codes may be a floppy disk, a hard disk, an optical disk, a magnetooptical disk, a CD-ROM, a magnetic tape, a non-volatile memory card, and a ROM.

Obviously, such program codes are other types of embodiments of this invention, not only for the case wherein the functions of the first and second embodiments are realized by executing the program codes supplied to the computer but also for the case wherein the functions of the first and second embodiments are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the functions of the first and second embodiment functions.

As described so far, according to the above embodiments, a stable and good input sense is ensured irrespective of different input conditions such as a vibration input position, a pen pressure and a pen angle.

(Third Embodiment)

<Description of Outline of Coordinate Input Apparatus (FIG. 10)>

Figure 10:
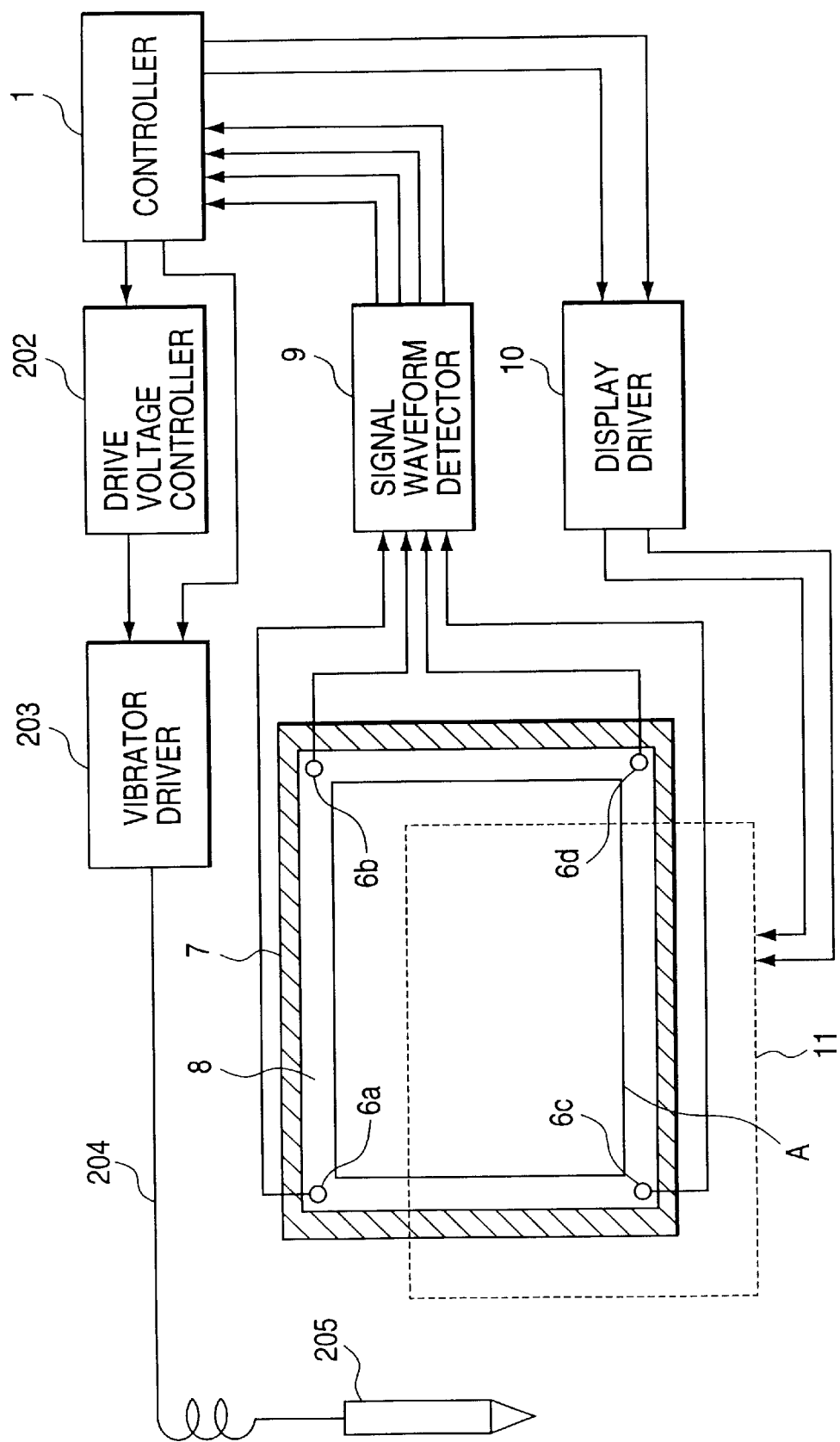
FIG. 10 is a diagram showing the structure of a coordinate input apparatus according to a third embodiment of the invention.

FIG. 10 is a block diagram showing the structure of a coordinate input apparatus according to the third embodiment of the invention. In FIG. 10, reference numeral 1 represents a controller for controlling the whole system and calculating a coordinate position in accordance with an input signal. Reference numeral 203 represents a vibrator driver for driving a vibrator in a vibrator input pen which is built in a vibration input pen 203. Reference numeral 202 represents a drive voltage controller which controls a drive voltage to be applied to the vibrator driver 203 to change the drive level of the vibration input pen 205.

Reference numeral 8 represents a vibration propagation plate made of transparent material such as acrylic resin and glass. A coordinate input is performed by touching the vibration propagation plate 8 with the vibration input pen 205. This coordinate input is practically performed by touching a desired point in an area (effective area) indicated by a solid line A in FIG. 10, with the vibration input pen 205. A vibration absorber 7 is provided at the periphery of the vibration propagation plate 8 in order to absorb vibration and prevent vibration from being reflected at the periphery and returned back to the center of the plate. Vibration sensors 6a to 6d are fixed to the corners of the vibration propagation plate 8, the sensors converting mechanical vibrations generated by a piezoelectric element or the like into electrical signals.

A signal waveform detector 9 supplies a signal representative of that a vibration is detected with each of the sensors 6a to 6d, to the controller 1. Reference numeral 11 represents a display such as a liquid crystal display which can display information in the unit of dot and is mounted at the back of the vibration propagation plate 8. The display 11 is driven by a display driver 10 so that it displays a dot at a position (coordinate position detected by a coordinate detection process to be described later) where the vibration input pen 205 touches, and that the dot can be transparently seen via the vibration propagation plate 8 (made of transparent material).

Figure 11:
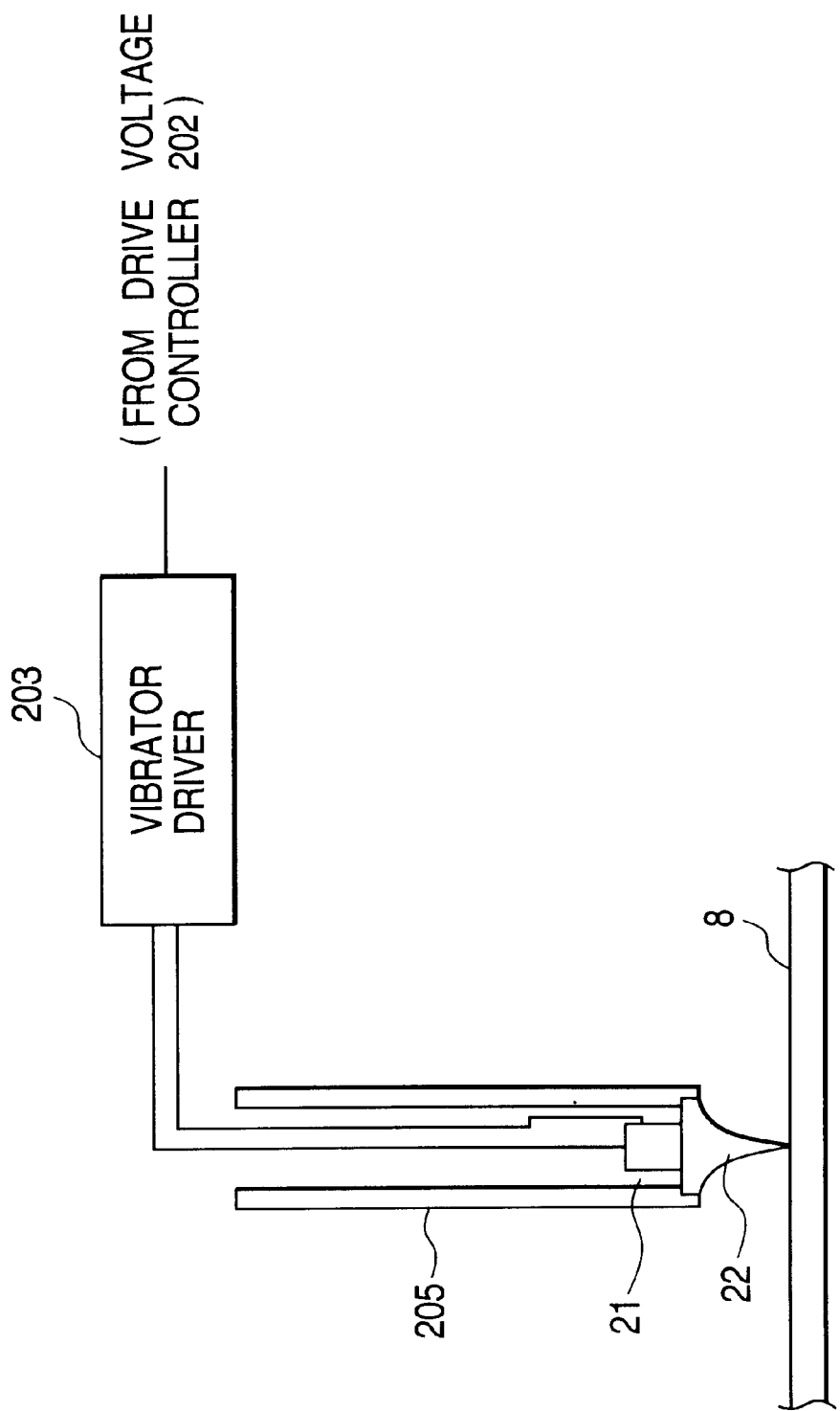
FIG. 11 is a block diagram showing the detailed structure of a vibration input pen shown in FIG. 10.

FIG. 11 is a schematic diagram showing the detailed structure of the vibration input pen 205. Reference numeral 21 represents a vibrator which generates ultrasonic vibration upon reception of a drive signal from the vibrator driver 203. Reference numeral 22 represents a pen tip from which ultrasonic vibration generated by the vibrator 21 is propagated to the vibration propagation plate 8. As a drive signal for the vibrator 21, a pulse signal (start signal) having a low level is supplied from the controller, amplified by the vibrator driver 203 at a predetermined gain, and applied to the vibrator 21. An electrical drive signal applied to the vibrator 21 is converted into a mechanical ultrasonic vibration. As the pen tip 22 becomes in touch with the vibration propagation plate 8, the vibration is propagated along the vibration propagation plate 8.

In the apparatus constructed as above, the controller 1 outputs a start signal for driving the vibration input pen 205 to the vibrator driver 203 at a predetermined interval (e.g., 10 ms). Upon reception of the start signal from the controller 1, the vibrator driver 203 drives the vibrator 21 at a drive voltage controlled by the drive voltage controller 203. When the start signal for driving the vibrator 21 in the vibration input pen 205 is output, the controller 1 starts counting time by using its internal timer (made of a counter). This internal timer measures a delay time of the vibration generated by the vibration input pen 205 required to reach each sensor 6a to 6d.

The signal waveform detector 9 detects a signal from each vibration sensor 6a to 6d to generate a signal representative of a vibration arrival time at each vibration sensor by performing a waveform detection process to be described later, and supplies this signal to the controller 1. In accordance with this signal representative of a vibration arrival time, the controller detects a vibration arrival time at each vibration sensor 6a to 6d to thus calculate the coordinate value of the vibration input pen 205. In accordance with this position information of the vibration input pen 105, the controller 1 drives the display driver 10 to control the display thereof, or outputs the coordinate value to an external apparatus via unrepresented serial/parallel communication units.

The elastic wave propagated in the above manner is a lamb wave which is advantageous in that the influence of scratches, obstacles or the like on the vibration propagation plate 8 is less as compared with surface waves.

<Description of Controller 1 (FIG. 12)>

Figure 12:
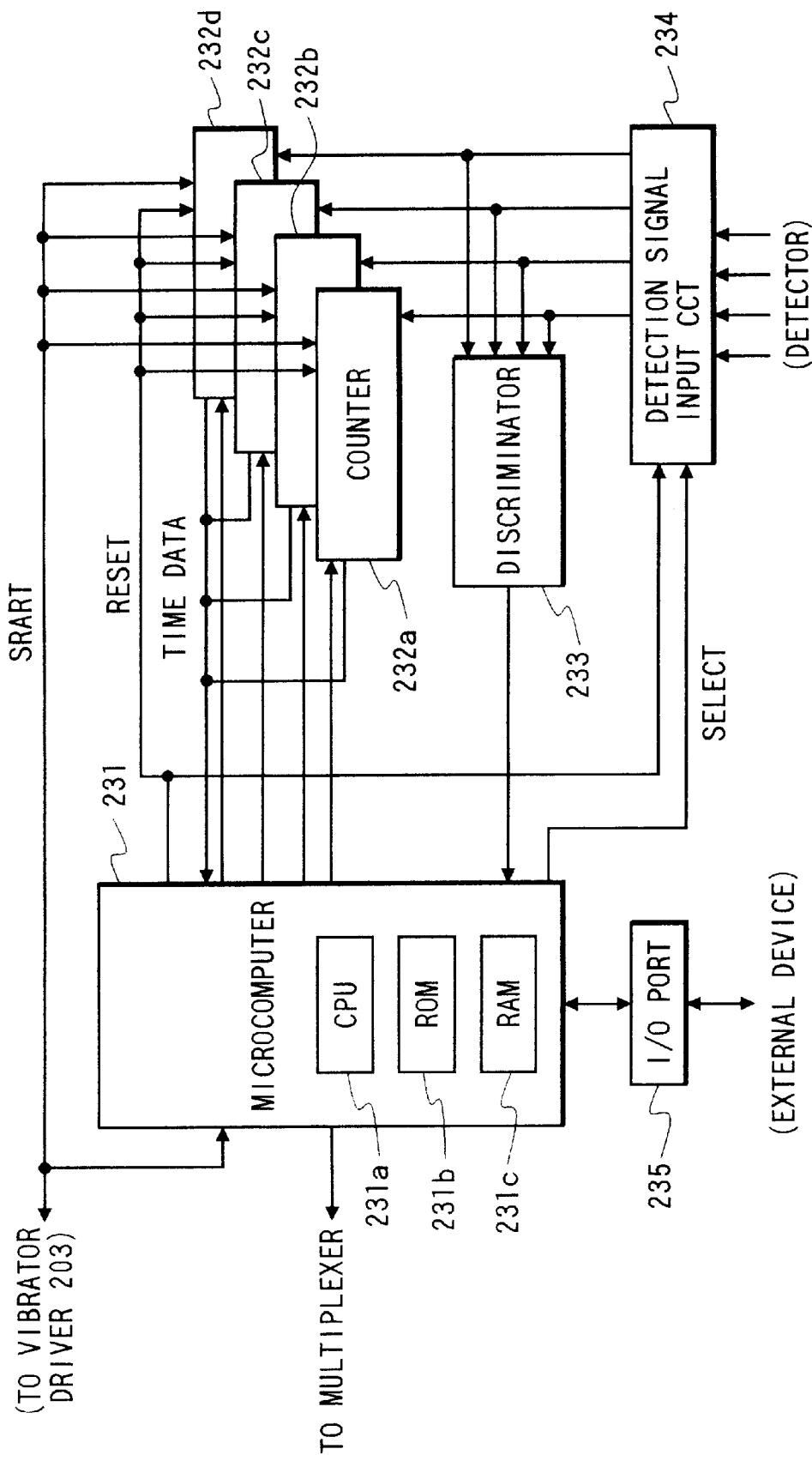
FIG. 12 is a block diagram showing the outline structure of the controller according to the third embodiment.

FIG. 12 is a block diagram showing the outline structure of the controller 1 according to the third embodiment. The outline of each constituent and its operation will be described with reference to FIG. 12.

In FIG. 12, reference numeral 231 represents a microcomputer for controlling the controller 1 and the whole of the coordinate input apparatus. The microcomputer is constituted of a CPU 231a, a ROM 231b for storing an operation sequence (control programs) to be executed by CPU 231a, a RAM 231c for providing a working area where CPU 231a executes various processes (such as calculation), and a non-volatile memory for storing constants or the like.

Reference numerals 232a to 232d are counters for counting a reference clock. The counters start counting at the timing when the start signal for starting driving the vibrator 21 of the vibration input pen 205 is input to the vibrator driver 203. Therefore, the start of counting and the vibration detection by each sensor (6a to 6d) can be synchronized so that a delay time of the vibration until the sensor detects it can be detected.

A vibration arrival timing signal supplied from each vibration sensor 6a to 6d and output from the signal waveform detector 9 is input via a detection signal input circuit 234 to the counters 232a to 232d which are provided in correspondence with the vibration sensors 6a to 6d.

When a discriminator 233 judges that all detection signals were received, it supplies a signal representative of such an effect to the microcomputer 231. Upon reception of this signal from the discriminator 233, the microcomputer 231 reads a vibration arrival time at each vibration sensor from each counter 232a to 232d (it is assumed that a count by each counter 232a to 232d is latched, for example, by an unrepresented latch). By using the read vibration arrival time, a predetermined calculation is performed to obtain the coordinate position of the vibration input pen 205 on the vibration propagation plate 8.

The calculated coordinate position is output via an I/O port 235 to the display driver 10 so that, for example, a dot or the like can be displayed on the display 11 at a corresponding position. Alternatively, the calculated coordinate position is output via the I/O port 235 to an interface circuit so that the coordinate value can be supplied to an external apparatus.

<Description of Vibration Propagation Time Detection (FIGS. 13 and 14)>

A principle of calculating a vibration arrival time at each sensor 6a to 6d will be described.

Figure 13:
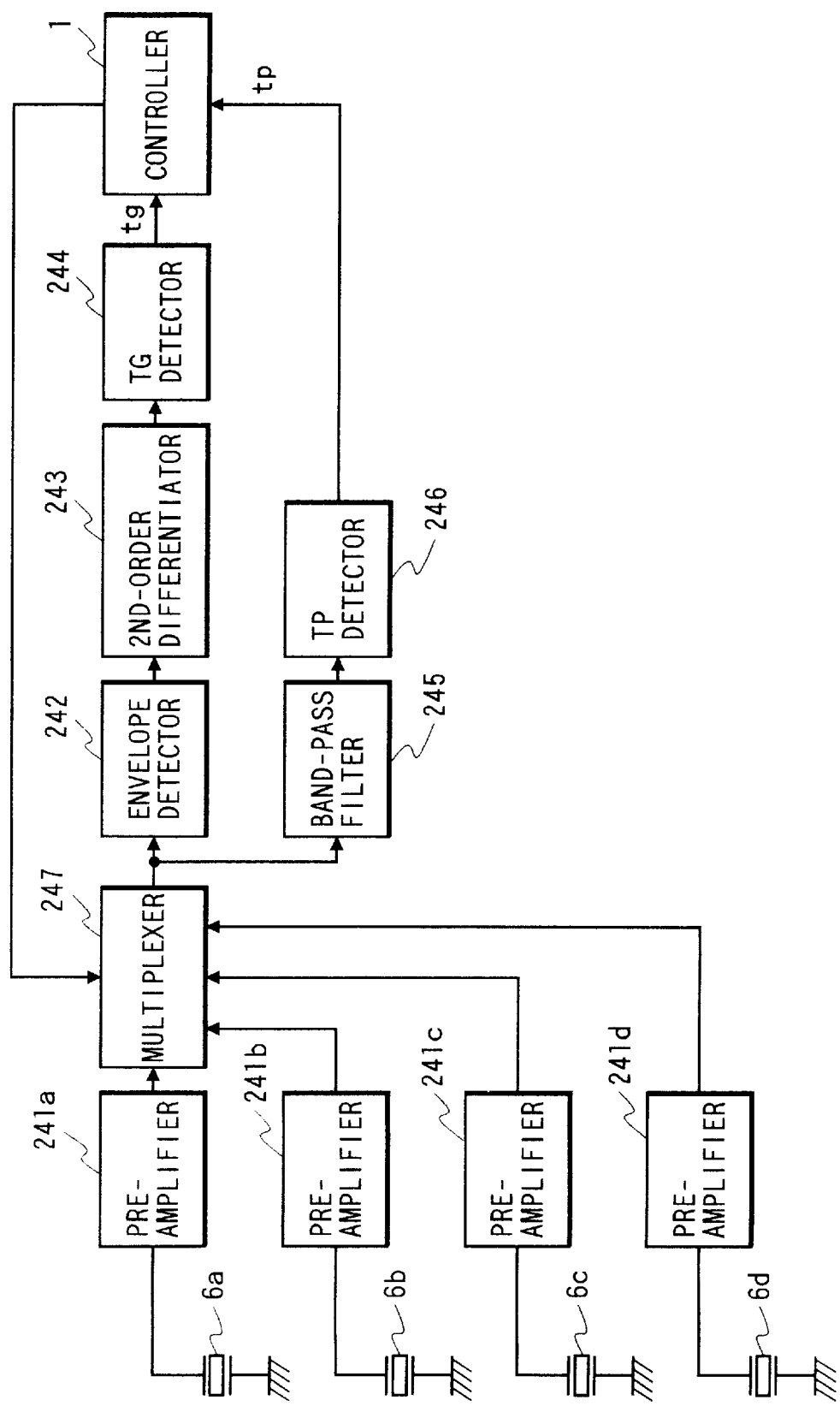
FIG. 13 is a block diagram showing the structure of a signal waveform detector shown in FIG. 10.
Figure 14:
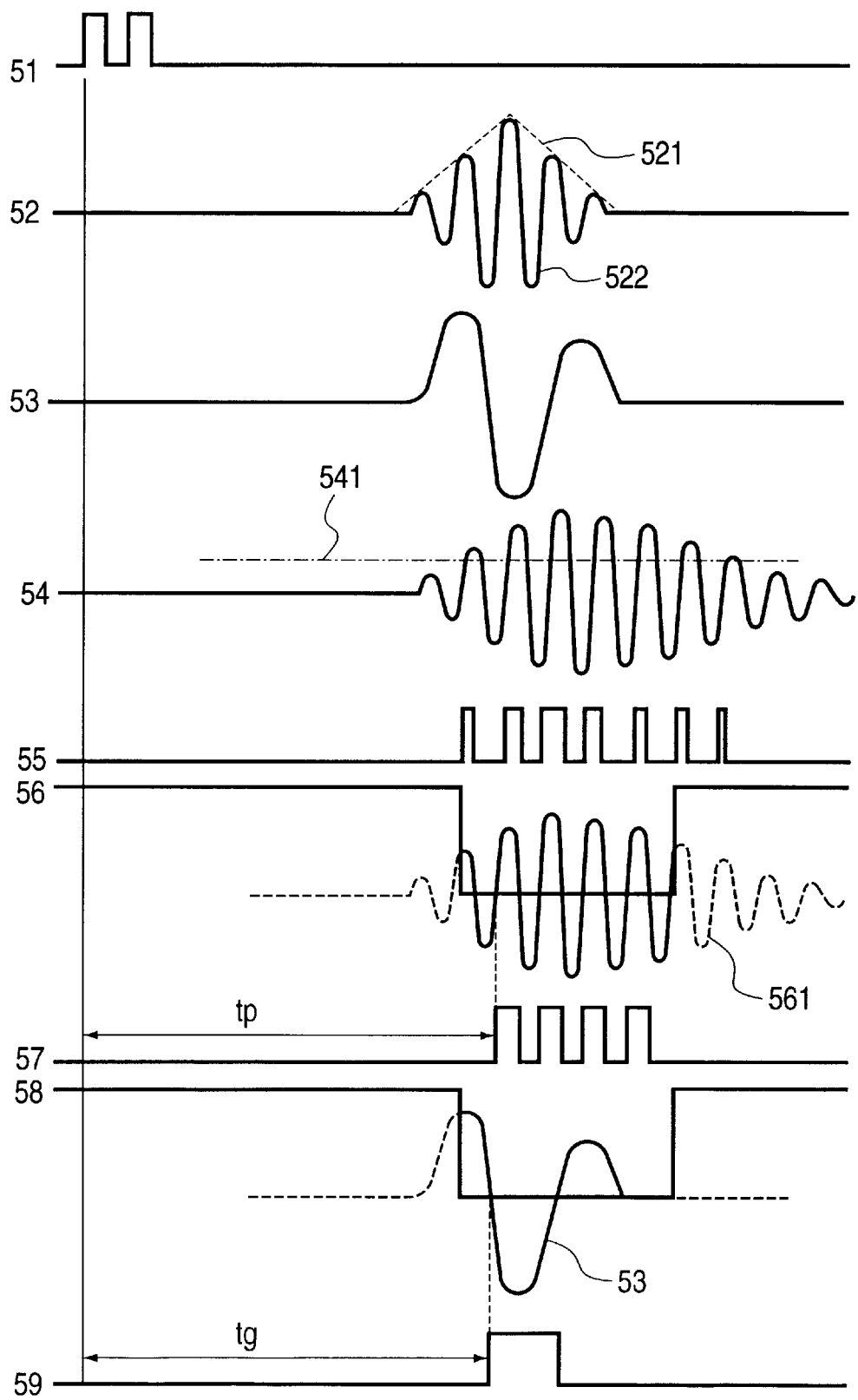
FIG. 14 is a diagram showing waveforms input to the signal waveform detector and illustrating a process of measuring a vibration propagation time in accordance with input waveforms.

FIG. 13 is a block diagram showing the structure of the signal waveform detector 9. FIG. 14 is a diagram showing the waveform of a detection signal input to the signal waveform detector and illustrating an operation of measuring a vibration propagation time in accordance with the input detection signal. In the following, although the operation will be described by using the vibration sensor 6a, the operations by the other vibration sensors 6b to 6d are the same as that by the vibration sensor 6a.

Measuring the vibration propagation time at the vibration sensor 6a starts at the same time when the start signal is output to the vibrator driver 203, as already described. At this time, a drive signal 51 is supplied from the vibrator driver 203 to the vibrator 21. Upon supply of this signal 51, an ultrasonic vibration propagated from the vibration input pen 205 to the vibration propagation plate 8 is detected by the vibration sensor 6a after a time lapse corresponding to the distance to the vibration sensor 6a. A signal detected by the vibration sensor 6a has a waveform 52 shown in FIG. 14.

An envelope detector 242 derives an envelope 521 from the signal detected by the vibration sensor 6a. This derived envelope signal 521 is differentiated by a second-order differentiator 243 and takes a waveform 53. A Tg detector 244 is made of a mono-multivibrator or the like and generates a window signal 58 having a predetermined width after the time when the envelope signal 521 exceeds a predetermined level. A zero cross point of the differentiated waveform 53 is detected during the active period of the window signal to thereby generate a delay time detection signal 59 and obtain a group delay time tg.

A phase signal 522 is applied to a band-pass filter 245 to obtain a signal 54. This signal 54 is compared with a predetermined threshold value 541 to generate pulse signals 55 during the periods where the signal 54 exceeds the threshold level 541. A window signal 56 having a predetermined width from the first one of the pulse signals 55 is generated. A zero cross point is detected during the active period of the window signal 56 to thereby obtain a phase delay time tp.

The phase changes with the propagation distance during vibration propagation. It is possible to detect the distance between the vibration input pen 205 and vibration sensor 6a in accordance with a group velocity Vg of the envelope 521 and a phase velocity Vp of the phase 522.

When the envelope 521 only is taken into consideration, its velocity is Vg. As a particular point or inflection point on the waveform is detected, the distance between the vibration input pen 205 and vibration sensor 6a is given by:

$$d = Vg \cdot tg \qquad (8)$$

where tg is the vibration propagating time. This equation is also applied to calculating the distance to other three vibration sensors 6b to 6d.

In order to determine the coordinate value more precisely, a process based on detection of a phase signal is performed. By using the time tp detected from the phase waveform signal 522, the distance between the vibration input pen and vibration sensor is therefore given by:

$$d = n \cdot \lambda p + Vp \cdot tp \qquad (9)$$

where $\lambda p$ is a wavelength of an elastic wave, and n is an integer.

From the equations (8) and (9), the integer n is given by:

$$n = [(Vg \cdot tg - Vp \cdot tp)/\lambda p + 1/N] \qquad (10)$$

where N is a real number excepting "0" and takes a proper value. If N=2, n can be determined if a change in tg or the like is in the range of ±1/2 wavelength. The value of n obtained from the equation (10) is substituted in the equation (9) so that the distance between the vibration input pen 205 and vibration sensor 6a can be calculated precisely.

The above calculations are performed for the vibration sensor 6a, by using a multiplexer 247, the same calculations being performed for the other sensors. Namely, the multiplexer 247 selects one of the signals supplied from the vibration sensors 6a to 6d in accordance with a signal supplied from the controller 1, and the selected signal is supplied to the envelope detector 242 and band-pass filter 245.

<Description of Coordinate Position Calculation (FIG. 15)>

Figure 15:
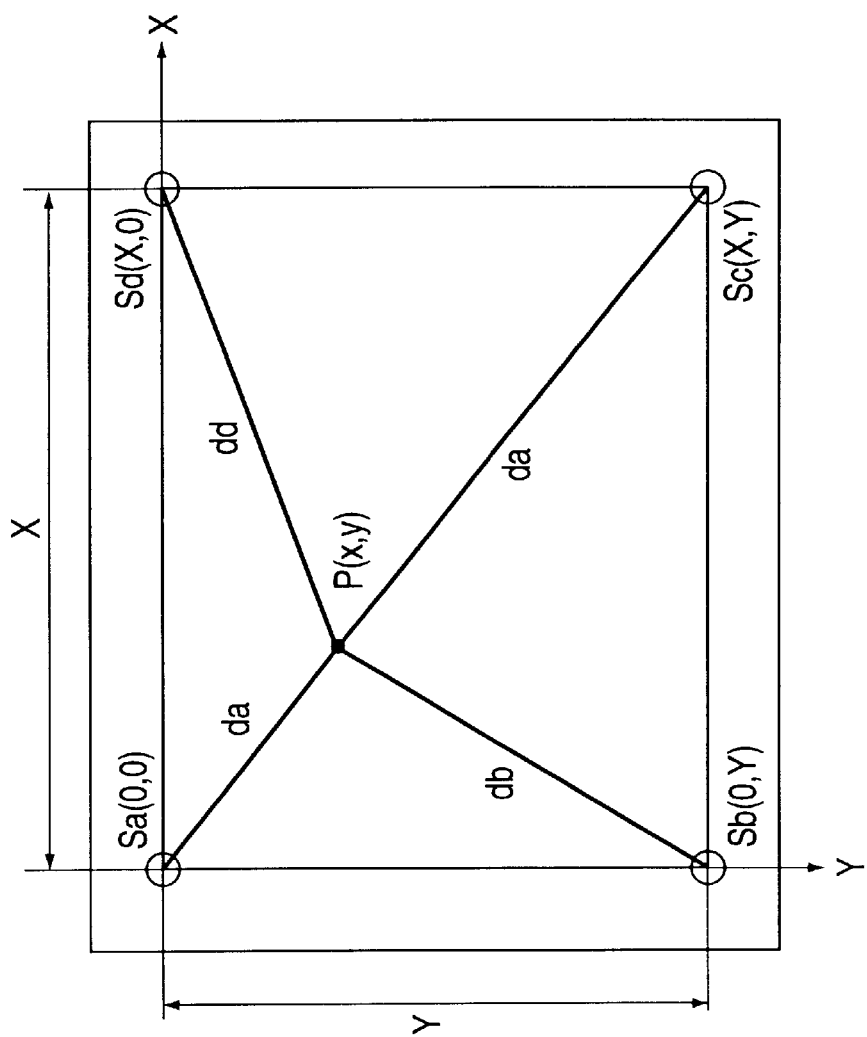
FIG. 15 is a diagram illustrating a method of detecting a coordinate value according to the third embodiment.

FIG. 15 is a diagram illustrating a method of detecting a coordinate value according to the third embodiment. The four vibration sensors 6a to 6d are set to positions Sa to Sd near at four corners of the vibration propagation plate 8. Linear distances da to dd from the position P of the vibration input pen 205 to the vibration sensors 6a to 6d can be obtained by the method described above. The controller 1 can calculate the coordinate value (x, y) of the position P of the vibration input pen 205 by the following equations by using the distances da to dd and the pythagorean theorem.

$$x = X/2 + (da+dd) \cdot (da-dd)/2X \qquad (11)$$

$$y = Y/2 + (da+db) \cdot (da-db)/2Y \qquad (12)$$

where X and Y are the distance between vibration sensors 6a and 6d and the distance between vibration sensors 6a and 6b.

<Description of Drive Voltage Control (FIGS. 16 and 17)>

Next, the control of a drive voltage for the vibration input pen 205, which is characteristic to the third embodiment, will be described.

Figure 16:
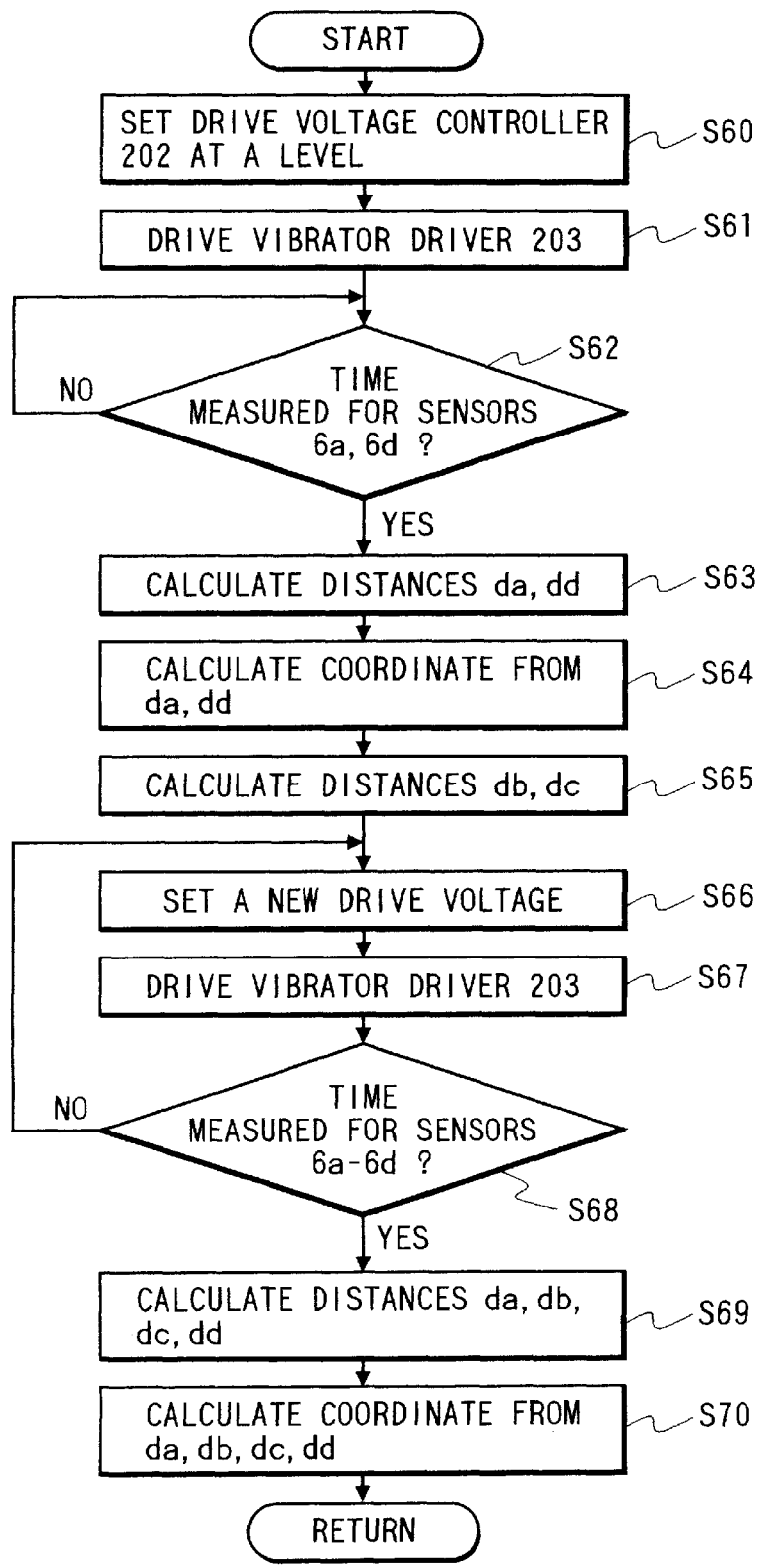
FIG. 16 is a flow chart illustrating a sequence of controlling a drive voltage of the vibration input pen.
Figure 17:
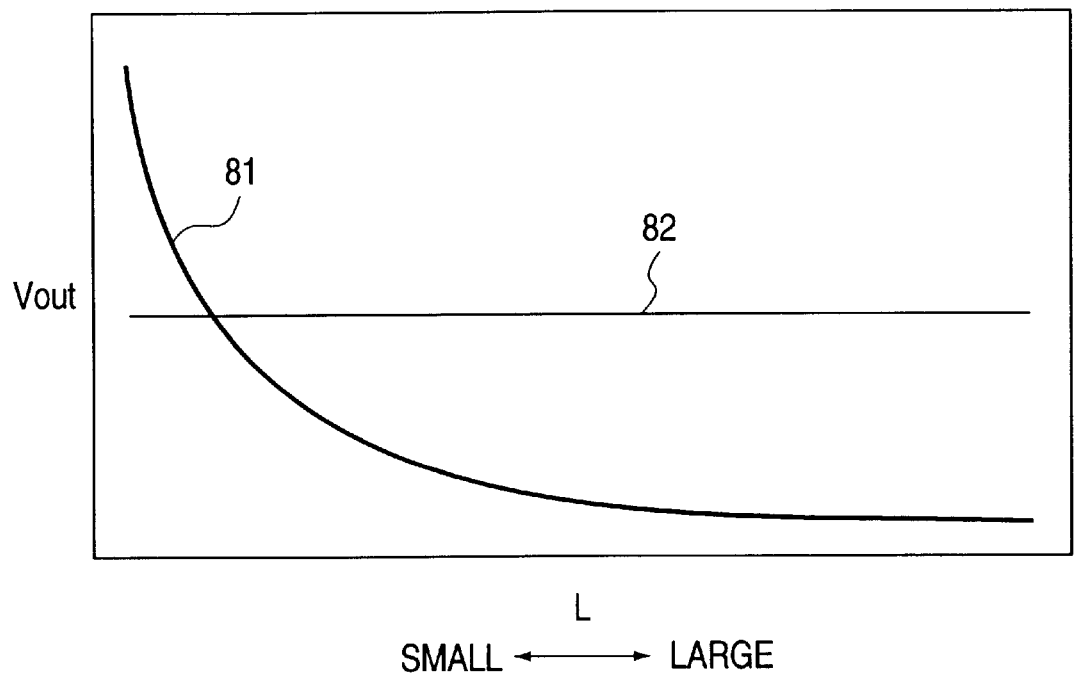
FIG. 17 is a graph briefly showing the relationship between a distance L from an input position of the vibration input pen to the vibration sensor and an output value Vout of an envelope detector.

FIG. 16 is a flow chart illustrating the operation of controlling the drive voltage for the vibration input pen 205. The control sequence illustrated in this flow chart can be realized by storing a program instruction sequence corresponding to the flow chart in ROM 231b of the microcomputer 231 and executing it by CPU 231a. FIG. 17 is a graph showing a relationship between a distance L from the input position of the vibration input pen 205 to the vibration sensor 6 and an output Vout of the envelope detector 242.

At Step S60, the drive voltage controller 202 is set with a predetermined level, and at Step S61 the vibrator driver 203 is driven. The detection level Vout attenuates as the distance L becomes long, as indicated at 81 in FIG. 17. At Step S62, times for the vibration sensors 6a and 6d are measured by the method described above. At Step S63, the distance da to the vibration sensor 6a from the input point of the vibration input pen and the distance dd to the vibration sensor 6d from the input point of the vibration input pen are calculated. By using the calculated distances da and dd, the coordinate value is calculated at Step S64 by the following equations.

$$x = X/2 + (da+dd) \cdot (da-dd)/2X \quad (13)$$

$$y = SQRT(da^2 - x^2) \quad (14)$$

where ^2 means a square. The coordinate value obtained by the above equations has a precision higher than that obtained by the equations (11) and (12). Therefore, although it has a sufficient precision for performing the next process (process of controlling a drive voltage), this coordinate value is not used as an output of the coordinate input apparatus.

At Step S65 the distances db and dc are calculated by using the coordinate values obtained by the equations (13) and (14). The processes at Steps S66 to S68 are repeated as many times as the number of vibration sensors. Namely, at Step S66 the drive voltage controller 202 sequentially sets a drive voltage corresponding to each distance da to da for each loop, and at Step S67 the vibrator driver 203 is driven to sequentially select each vibration sensor 6a to 6d and measure the delay time.

Figure 18:
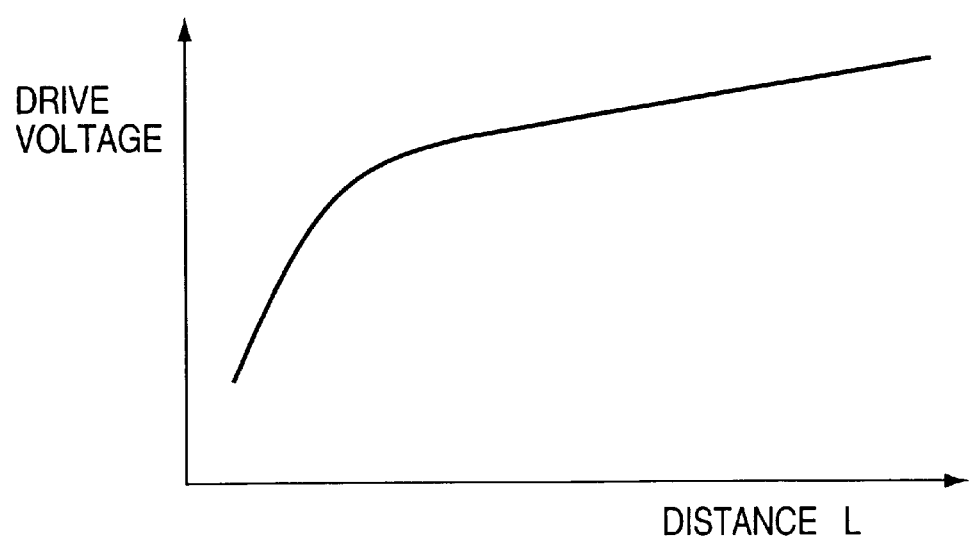
FIG. 18 is a diagram showing the relationship between a drive voltage of a vibrator and a distance L.

FIG. 18 is a graph showing the relationship between a vibrator drive voltage and a distance L. The relationship between the distance and drive voltage is set so that the envelope signal level attenuating as the distance L becomes long has a constant attenuation degree with respect to the distance. It is assumed that the relationship (between the distance L and drive voltage) shown in FIG. 18 is stored in the form of table in RAM 231c of the microcomputer 231. At Step S66 the drive voltage is set by referring to this table. By setting the drive voltage of the vibrator in the above manner, the detection signal level at each vibration sensor 6a to 6d becomes as indicated at 82 in FIG. 17. Namely, even if the distance changes, the detection level at each vibration sensor becomes generally constant. The drive voltage is set so that the detection level is near at the middle level of the power source voltage.

As described above, the drive voltage of the vibrator is set in accordance with the input position and the distance to the vibration sensor (Step S66), and the vibration input pen is driven at this drive voltage to measure the delay time (Step S67). These operations are performed for all the vibration sensors by sequentially selecting the vibration sensors 6a to 6d by the multiplexer 247 (Step S68). After signal detection by all the vibration sensors is completed, the distances da to dd are calculated at Step S69, and the coordinate values are calculated at Step S70. The calculated coordinate values are output via the I/O port 235.

As described above, according to the third embodiment, since the drive voltage of the vibrator is controlled, a variation of the detection level to be caused by a change in the distance between the input point of the vibration input pen 205 and each vibration sensor 6 can be suppressed. Accordingly, signal detection can be performed stably at each point on the coordinate input surface and the coordinate input apparatus with a high precision can be provided. Further, in calculating the coordinate value in order to set the drive level for each vibration sensor, only two sensors are used so that it is possible to set the drive level at high speed and with low consumption power. It is also possible to prevent the time resolution of the apparatus from being lowered and a low power consumption can be enhanced.

(Fourth Embodiment)

In the third embodiment, in accordance with the distance between the vibration input pen 205 and vibration sensor 6, the drive voltage controller 203 controls the drive voltage of the vibrator driver 203. Similar advantageous effects may be obtained by making the gain of the pre-amplifiers 241 variable.

Figure 19:
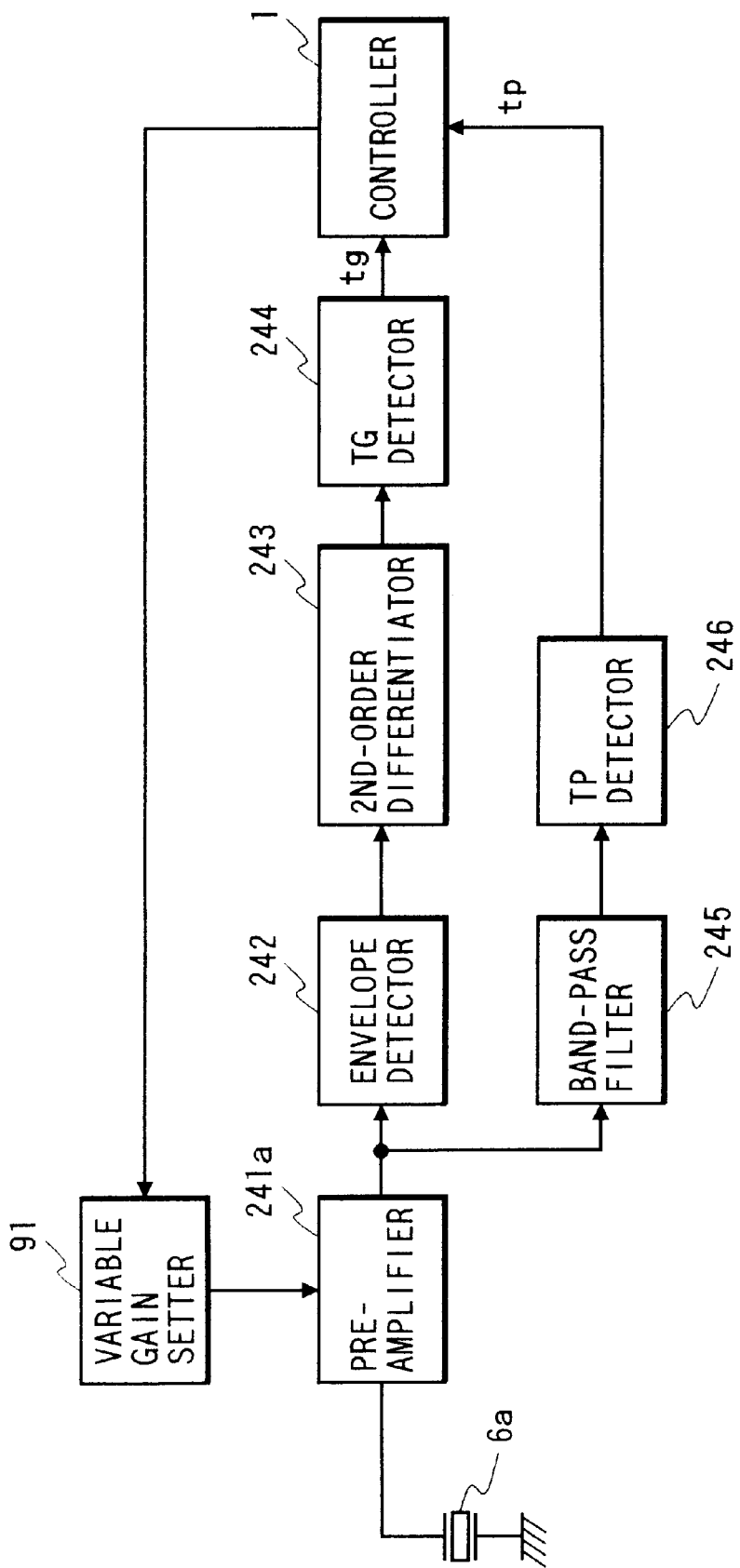
FIG. 19 is a block diagram showing a signal waveform detector according to a fourth embodiment of the invention.

FIG. 19 is a block diagram showing the structure of the signal waveform detector 9 according to the fourth embodiment of the invention. In FIG. 19, like elements to those of the third embodiment (FIG. 13) are represented by using identical reference numerals. Reference numeral 91 represents a variable gain setter which sets the gain of the pre-amplifier 241a in accordance with a gain setting signal supplied from the controller 1. FIG. 19 shows the circuit for the vibration sensor 6a. The same circuit structure is used also for the other vibration sensors 6b to 6d.

Figure 20:
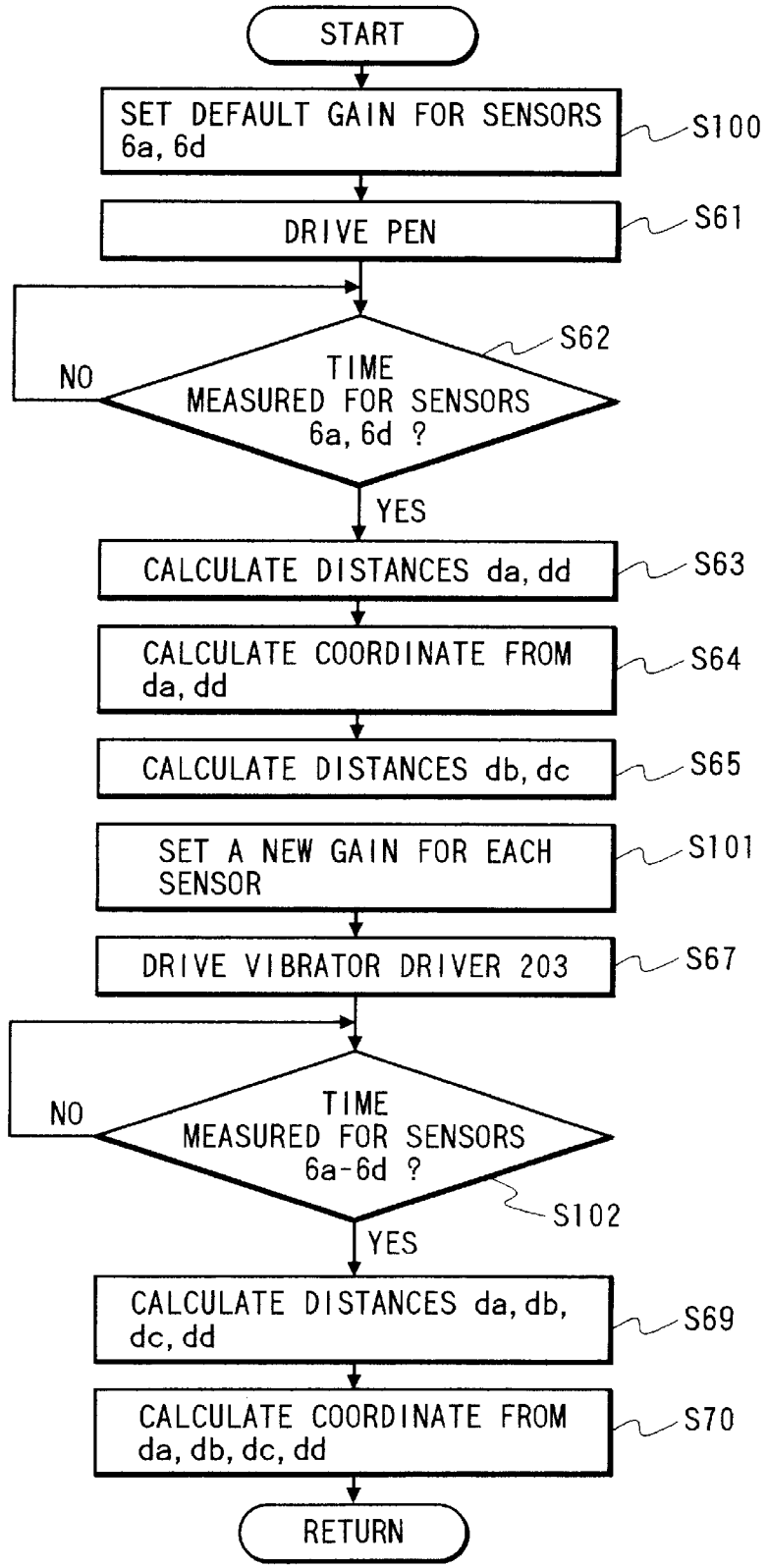
FIG. 20 is a flow chart illustrating an operation of controlling a drive voltage of a vibration input pen according to the fourth embodiment.

FIG. 20 is a flow chart illustrating the operation of controlling the drive voltage of the vibration input pen 205 according to the fourth embodiment. In FIG. 20, similar processes to those of the third embodiment (FIG. 16) are represented by using identical Step numbers, and the detailed description thereof is omitted. In the fourth embodiment, Steps S60 and S66 shown in FIG. 16 for setting the drive voltage are replaced by a process of setting the gain of the pre-amplifier by the variable gain setter.

First, at Step S100 a standard gain is set to the pre-amplifiers connected to the vibration sensors 6a and 6d. Under this state, the vibration input pen is driven to measure the delay times by the vibration sensors 6a and 6d and obtain the coordinate values (Steps S61 to S64). In accordance with the calculated coordinate values, a distance between the vibration applied point and each vibration sensor is calculated, and in accordance with this calculated distance, the gain of the pre-amplifier of each vibration sensor is set (Step S101). The relationship between the distance and gain is generally the same as that shown in FIG. 18. The gain is set so that the envelope signal level attenuating as the distance L becomes long has a constant attenuation degree with respect to the distance.

In the fourth embodiment, it is unnecessary to change the drive voltage of the vibrator for each vibration sensor. Therefore, a delay time at each vibration sensor can be measured by applying a vibration once for all vibration sensors. Accordingly, at Step S101 a proper gain of the pre-amplifier for each vibration sensor is set. After the vibration input pen is driven, the vibration delay time at each vibration sensor 6a to 6d is measured (Steps S67 and S102). In accordance with the measured delay time, the coordinate value is calculated (Steps S69 and S70).

As described above, also with the structure of the fourth embodiment, a variation of the detection level to be caused by a change in the distance between the input point of the vibration input pen 205 and each vibration sensor 6 can be suppressed. Accordingly, signal detection can be performed stably and the coordinate input apparatus with a high precision can be provided. Further, according to the fourth embodiment, each vibration sensor is provided with the pre-amplifier and signal waveform detector so that the delay times at the four vibration sensors can be acquired by driving the vibrator only once to thereby improve the time resolution.

As in the case of the third embodiment, one signal waveform detector may be connected via a multiplexer to each vibration sensor to share one detector by a plurality of vibration sensors. In this case, the structure can be simplified, although a sampling rate is degraded to some degree because the connection between the signal waveform detector and each vibration sensor is sequentially switched.

The present invention may be applied to a system constituted by a plurality of apparatuses (e.g., a host computer, interface units, a reader, a printer, and the like) or to a system constituted by a single apparatus (e.g., a copier or a fax).

The scope of the invention also includes a system or apparatus whose computer (CPU or MPU) runs to operate various devices connected thereto in accordance with software program codes supplied to the system or apparatus so as to realize the functions of the above third and fourth embodiments.

In this case, the software program codes themselves realize the functions of the third and fourth embodiments. Therefore, the program code themselves and means for supplying such program codes to a computer, e.g., a storage medium storing such program codes, constitute the present invention.

A storage medium storing such program codes may be a floppy disk, a hard disk, an optical disk, a magnetooptical disk, a CD-ROM, a magnetic tape, a non-volatile memory card, and a ROM.

Obviously, such program codes are other types of embodiments of this invention, not only for the case wherein the functions of the third and fourth embodiments are realized by executing the program codes supplied to the computer but also for the case wherein the functions of the third and fourth embodiments are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the functions of the third and fourth embodiment functions.

As described so far, according to the above embodiments, vibration can be detected at a stable signal level, and the coordinate value can be calculated at high precision.

Further, according to the above embodiments, in accordance with the distance between a designated point on the input surface and each sensor, the drive state of the apparatus is set. It is therefore possible to detect vibration at a stable signal level at any point on the input surface. In particular, if the drive state of the apparatus is set in accordance with a rough distance between a designated point on the input surface and each sensor, a driver for setting the drive state can be simplified and its operation amount can be reduced so that an increase in a consumption power and a reduction of a sampling rate can be prevented.

(Fifth Embodiment)

Although some of the drawings used in the following are duplicated with the third embodiment, they will be described again.

Figure 21:
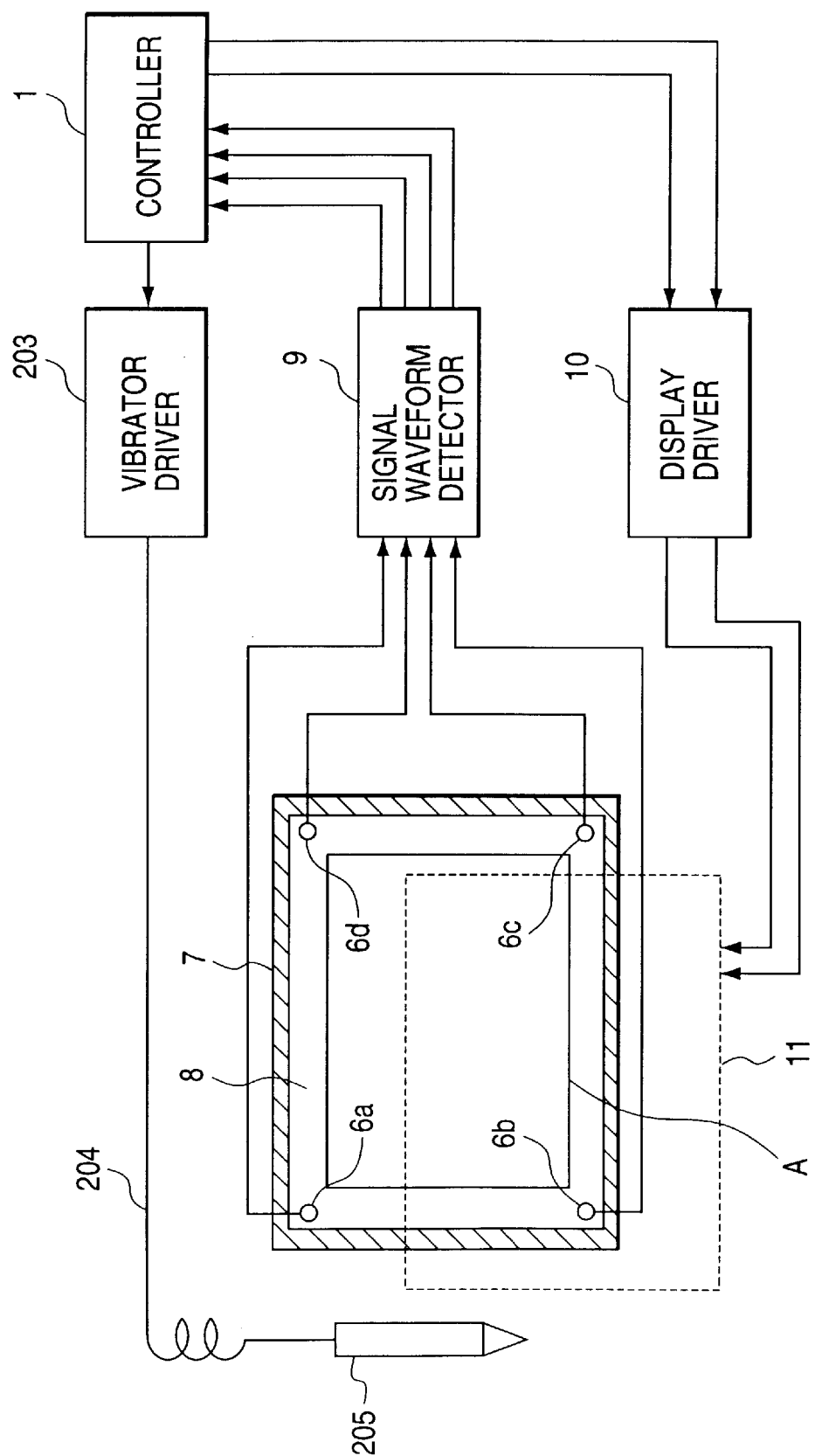
FIG. 21 is a diagram showing an example of the structure of a coordinate input apparatus according to a fifth embodiment of the invention.

FIG. 21 is a diagram showing the structure of a coordinate input apparatus according to the fifth embodiment of the invention. In FIG. 21, reference numeral 1 represents a controller for controlling the whole system and calculating a coordinate position in accordance with an input signal. A vibrator driver 203 is connected to the controller and drives the vibrator in a vibrator input pen 205 via a lead wire 204. Reference numeral 8 represents a vibration propagation plate made of transparent material such as acrylic resin and glass. A coordinate input is performed by touching the vibration propagation plate 8 with the vibration input pen 205. This coordinate input is practically performed by touching a desired point in an area (effective area) indicated by a solid line A in FIG. 21, with the vibration input pen 205. A vibration absorber 7 is provided at the periphery of the vibration propagation plate 8 in order to absorb vibration and prevent vibration from being reflected at the periphery and returned back to the center of the plate. Vibration sensors 6a to 6d are fixed to the corners of the vibration propagation plate 8, the sensors converting mechanical vibrations generated by a piezoelectric element or the like into electrical signals.

The vibration sensors 6a to 6d are connected to a signal waveform detector 9 which supplies a signal representative of that a vibration is detected with each of the sensors 6a to 6d, to the controller 1. A display 11 capable of displaying data in the unit of dot is disposed at the back of the vibration propagation plate 8. The display 11 is driven by a display driver 10 connected to the controller 1 so that it displays a dot at a position where the vibration input pen 205 touches, and the dot can be transparently seen via the vibration propagation plate 8 (made of transparent material). In this manner, a dot can be displayed on the display 11 at the position corresponding to the coordinate of the vibration input pen, and an image constituted of drawing elements such as dots and lines can be drawn tracing the locus of the vibration input pen as if it is drawn on a paper sheet by using a real pen.

<Description of Controller>

In the apparatus constructed as above, the controller 1 outputs a signal for driving the vibration input pen 205 to the vibrator driver 203 at a predetermined interval (e.g., 10 ms), and at the same time starts counting by its internal timer (made of a counter). The vibration generated by the vibration input pen 205 reaches each vibration sensor 6a to 6d with a delay time corresponding to the distance to each vibration sensor.

The signal waveform detector 9 detects a signal from each vibration sensor 6a to 6d to generate a signal representative of a vibration arrival time at each vibration sensor by performing a waveform detection process to be described later, and supplies this signal to the controller 1. In accordance with this signal representative of a vibration arrival time, the controller detects a vibration arrival time at each vibration sensor 6a to 6d to thus calculate the coordinate value of the vibration input pen 205. In accordance with this position information of the vibration input pen 205, the controller 1 drives the display driver 10 to control the display on the display 11, or outputs the coordinate value to an external apparatus (not shown) via unrepresented serial/parallel communication units.

Figure 22:
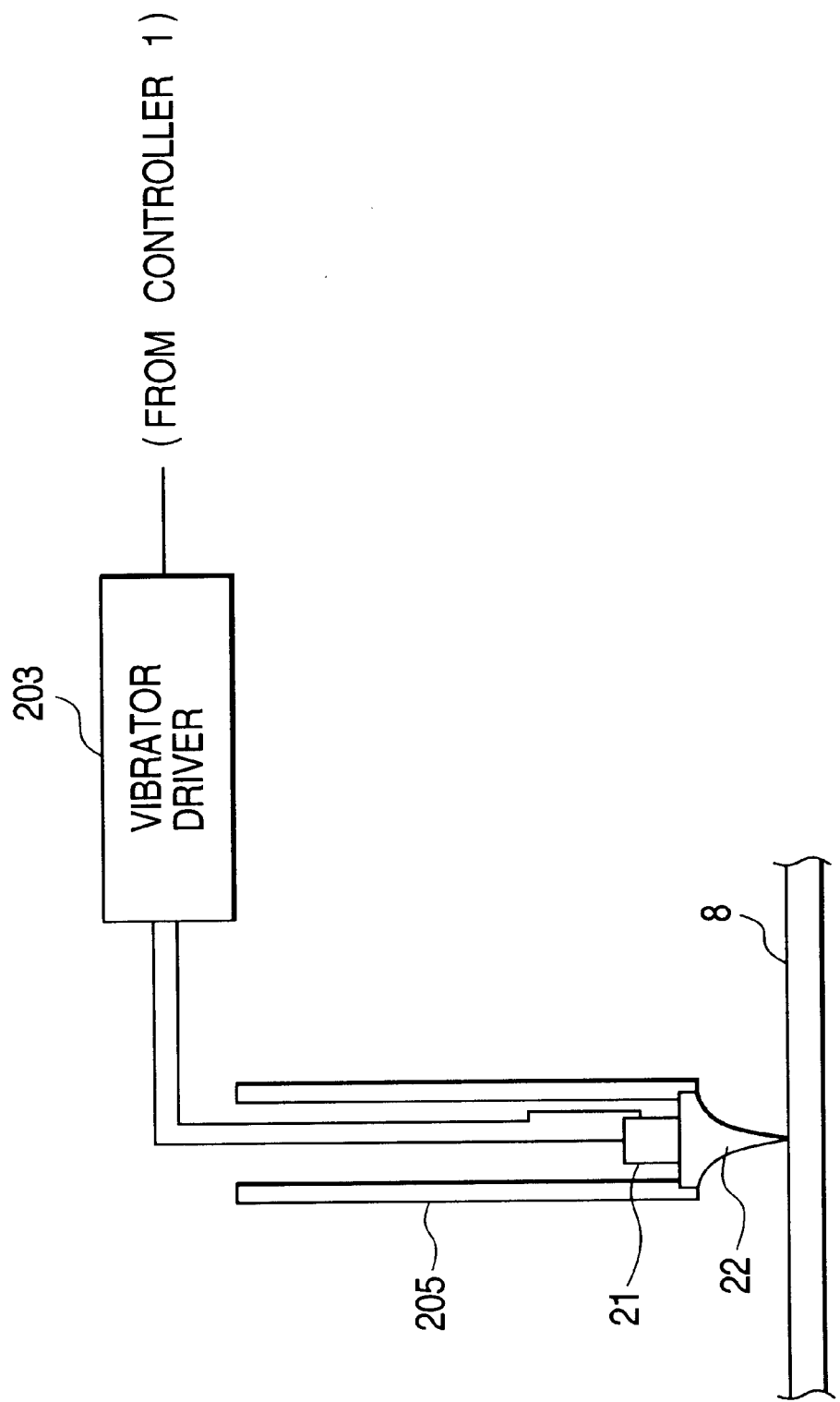
FIG. 22 is a diagram showing the outline structure of a coordinate input unit according to the fifth embodiment.

As shown in FIG. 22, a vibrator 21 built in the vibration input pen 205 is driven by a vibrator driver 203. As a drive signal of the vibrator 21, a pulse signal having a low level is supplied from the controller 1, amplified at a predetermined gain, and applied to the vibrator 21. An electrical drive signal is converted by the vibrator 21 into mechanical ultrasonic vibrations which are propagated via the pen tip to the vibration propagation plate 8.

The elastic wave propagated in the above manner is a lamb wave which is advantageous in that the influence of scratches, obstacles or the like on the vibration propagation plate 8 is less as compared with surface waves.

Figure 23:
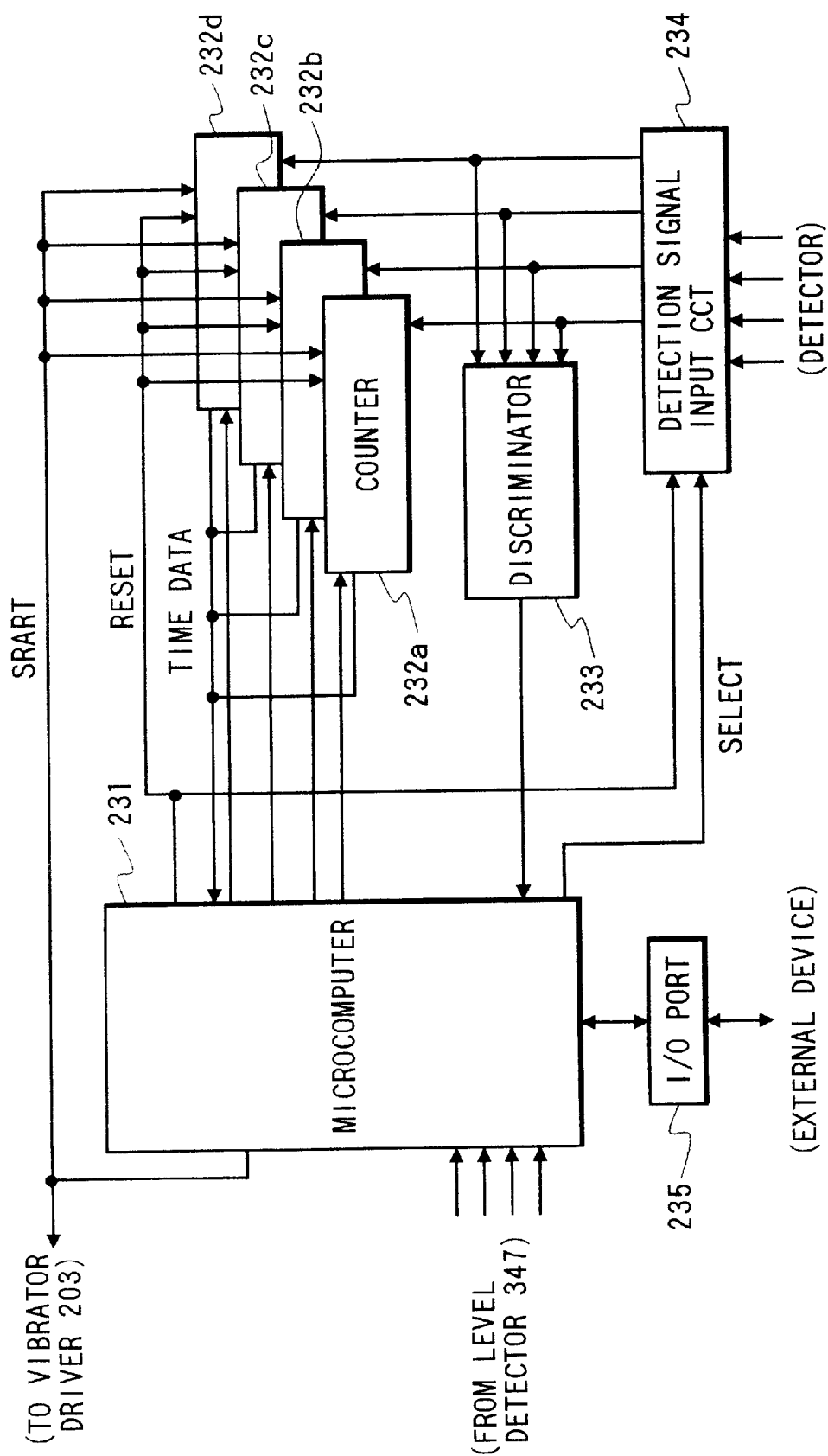
FIG. 23 is a block diagram showing the detailed structure of a controller shown in FIG. 21.

FIG. 23 is a block diagram showing the outline structure of the controller 1 according to the fifth embodiment. The outline of each constituent and its operation will be described with reference to FIG. 23.

In FIG. 23, reference numeral 231 represents a microcomputer for controlling the controller 1 and the whole of the coordinate input apparatus. The microcomputer is constituted of an internal counter, a ROM for storing an operation sequence, a RAM for providing a working area for calculations, and a non-volatile memory for storing constants or the like.

Reference numerals 232a to 232d are counters for counting a reference clock. The counters start counting at the timing when the start signal for starting driving the vibrator 21 of the vibration input pen 205 is input to the vibrator driver 203. Therefore, the start of counting and the vibration detection by each sensor (6a to 6d) can be synchronized so that a delay time of the vibration until the sensor detects it can be detected.

Other circuits of the constituent element will be sequentially described hereinunder.

A vibration arrival timing signal supplied from each vibration sensor 6a to 6d and output from the signal waveform detector 9 is input via a detection signal input circuit 234 to the counters 232a to 232d which are provided in correspondence with the vibration sensors 6a to 6d.

When a discriminator 233 judges that all detection signals were received, it supplies a signal representative of such an effect to the microcomputer 231. Upon reception of this signal from the discriminator 233, the microcomputer 231 reads a vibration arrival time at each vibration sensor from a latch circuit of each counter 232a to 232d. By using the read vibration arrival time, a predetermined calculation is performed to obtain the coordinate value of the vibration input pen 205 on the vibration propagation plate 8.

The calculated coordinate value is output via an I/O port 235 to the display driver 10 so that, for example, a dot or the like can be displayed on the display 11 at a corresponding position. Alternatively, the calculated coordinate position is output via the I/O port 235 to an interface circuit so that the coordinate value can be supplied to an external apparatus.

As will be later described, the microcomputer 231 is input with a signal from a level detector 347 shown in FIG. 24.
<Description of Vibration Propagation Time Detection (FIGS. 24 and 25)>

A principle of calculating a vibration arrival time to each sensor 6a to 6d will be described.

Figure 24:
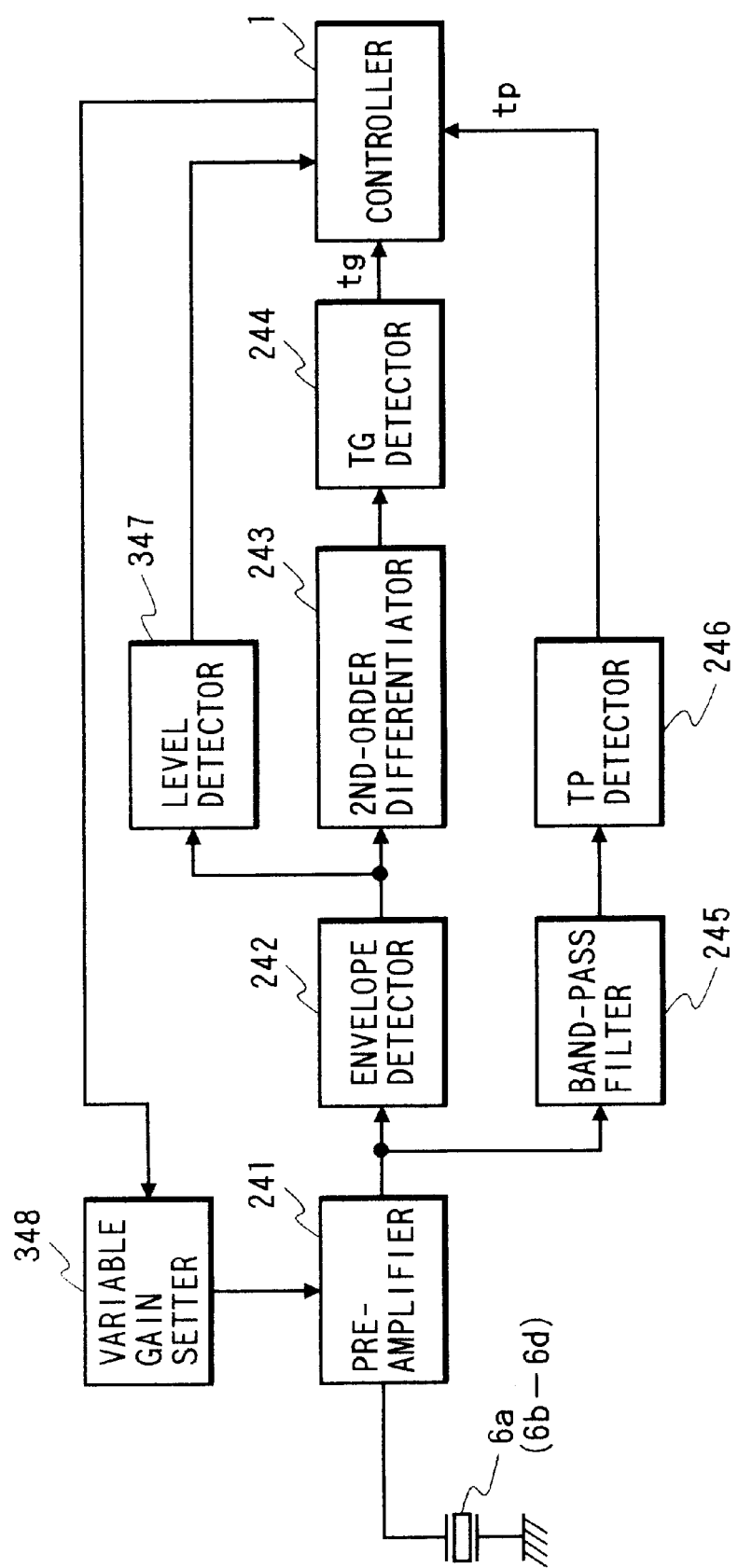
FIG. 24 is a block diagram showing the detailed structure of a signal waveform detector shown in FIG. 21.
Figure 25:
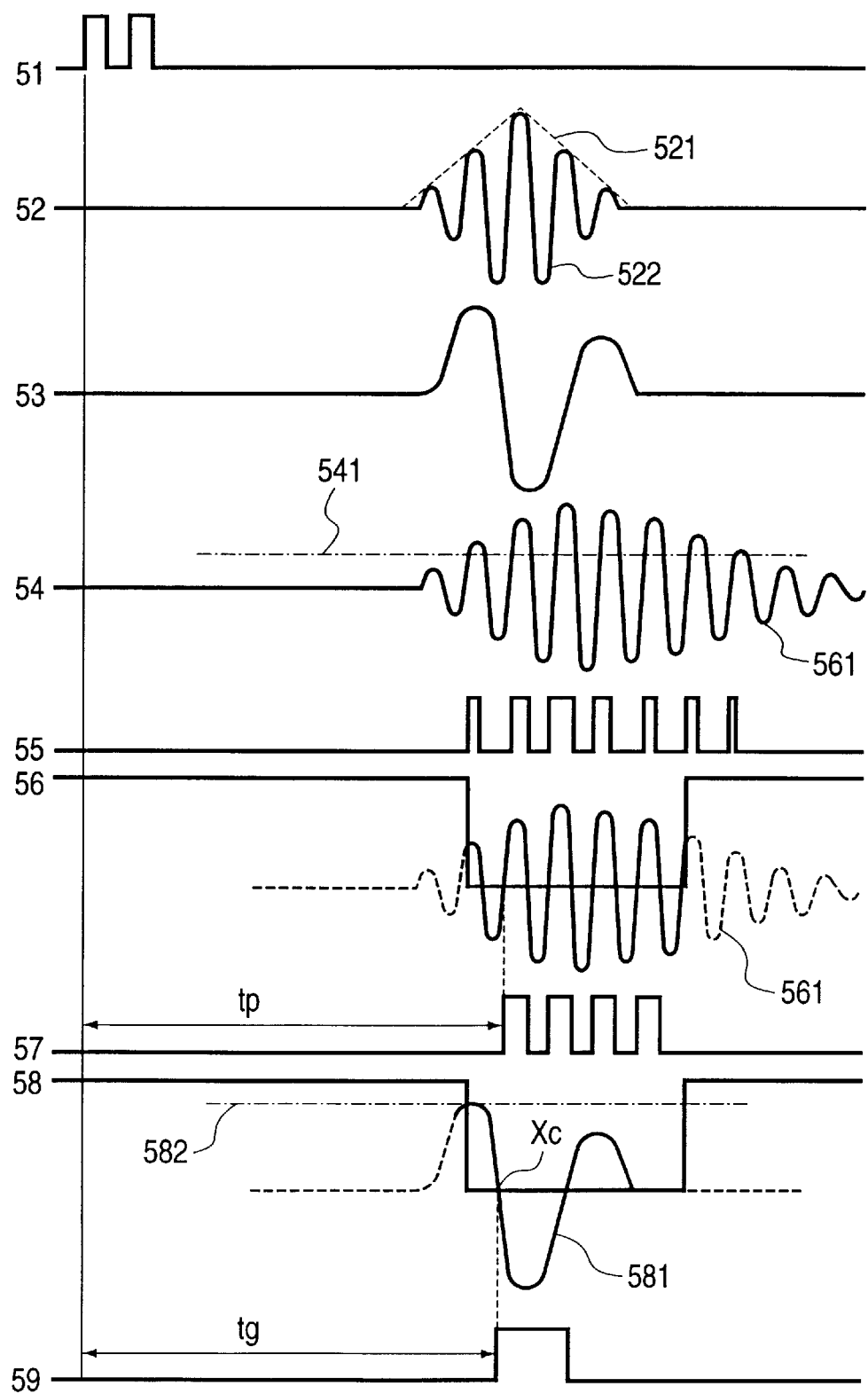
FIG. 25 is a diagram showing waveforms input to the signal waveform detector and illustrating a process of measuring a vibration propagation time in accordance with input waveforms.

FIG. 24 is a block diagram showing the structure of the signal waveform detector 9. FIG. 25 is a diagram showing the waveform of a detection signal input to the signal waveform detector and illustrating an operation of measuring a vibration propagation time in accordance with the input detection signal. In the following, although the operation will be described by using the vibration sensor 6a, the operations by the other vibration sensors 6b to 6d are the same as that by the vibration sensor 6a.

Measuring the vibration propagation time required for the vibration to reach the vibration sensor 6a starts at the same time when the start signal is output to the vibrator driver 203, as already described. At this time, a drive signal 51 shown in FIG. 25 is supplied from the vibrator driver 203 to the vibrator 21. Upon supply of this signal 51, an ultrasonic vibration propagated from the vibration input pen 205 to the vibration propagation plate 8 is detected by the vibration sensor 6a after a time lapse corresponding to the distance to the vibration sensor 6a. A signal detected by the vibration sensor 6a has a waveform 52 shown in FIG. 25. After the signal detected by the vibration sensor 6a is amplified by a pre-amplifier 241, an envelope detector 242 derives an envelope 521 from the signal detected by the vibration sensor 6a. This derived envelope signal 521 is input to a level detector 347 made of a peak-hold circuit and the like, and an output from the level detector is used by a process to be described later. The envelop signal 521 is differentiated by a second-order differentiator 243 and takes a waveform 53. A Tg detector 244 receiving an output from the second-order differentiator 243 is made of a mono-multivibrator or the like. A zero cross point Xc (at 58 in FIG. 25) of the second-order differentiated signal of the envelope is detected in the active period of a window signal having a threshold level 582 to be described later, to thereby generate a signal tg 59 which is a delay time detection signal.

The signal detected by the vibration sensor is applied to a band-pass filter 245 which outputs a signal 561 indicated at 54 in FIG. 25 in accordance with the phase signal 522. An output 54 of the band-pass filter 245 is compared with a predetermined threshold value 541 to generate pulse signals 55 during the periods where the signal 54 exceeds the threshold level 541. A window signal 56 having a predetermined width from the first one of the pulse signals 55 is generated. A Tp detector 246 detects a time tp until the signal 561 zero-crosses.

The phase changes with the propagation distance during vibration propagation. It is possible to detect the distance between the vibration input pen 205 and vibration sensor 6a in accordance with a group velocity Vg of the envelope 521 and a phase velocity Vp of the phase 522.

When the envelope 521 only is taken into consideration, its velocity is Vg. As a particular point or inflection point on the waveform or a zero cross point of the signal 58 shown in FIG. 25 is detected, the distance between the vibration input pen 205 and vibration sensor 6a is given by:

$$d = Vg \cdot tg \quad (15)$$

where tg is the vibration propagating time. This equation is also applied to calculating the distance to other three vibration sensors 6b to 6d.

In order to determine the coordinate value more precisely, a process based on detection of a phase signal is performed. By using the time tp detected from the phase waveform signal 522, the distance between the vibration input pen and vibration sensor is therefore given by:

$$d = n \cdot \lambda p + Vp \cdot tp \quad (16)$$

where λp is a wavelength of an elastic wave, and n is an integer.

From the equations (8) and (9), the integer n is given by:

$$n = [(Vg \cdot tg - Vp \cdot tp)/\lambda p + 1/N] \quad (17)$$

where N is a real number excepting "0" and takes a proper value. If N=2, n can be determined if a change in tg or the like is in the range of ±1/2 wavelength.

The value of n obtained from the equation (17) is substituted in the equation (16) so that the distance between the vibration input pen 205 and vibration sensor 6a can be calculated precisely.

The above-described circuit is used for the vibration sensor 6a, and the same circuit is also used for the other sensors.

<Description of Detection and Control of Obstacle (FIGS. 26 and 27)>

A method of detecting an obstacle on a vibration propagation plate, which is characteristic to the fifth embodiment, will be described.

Figure 26:
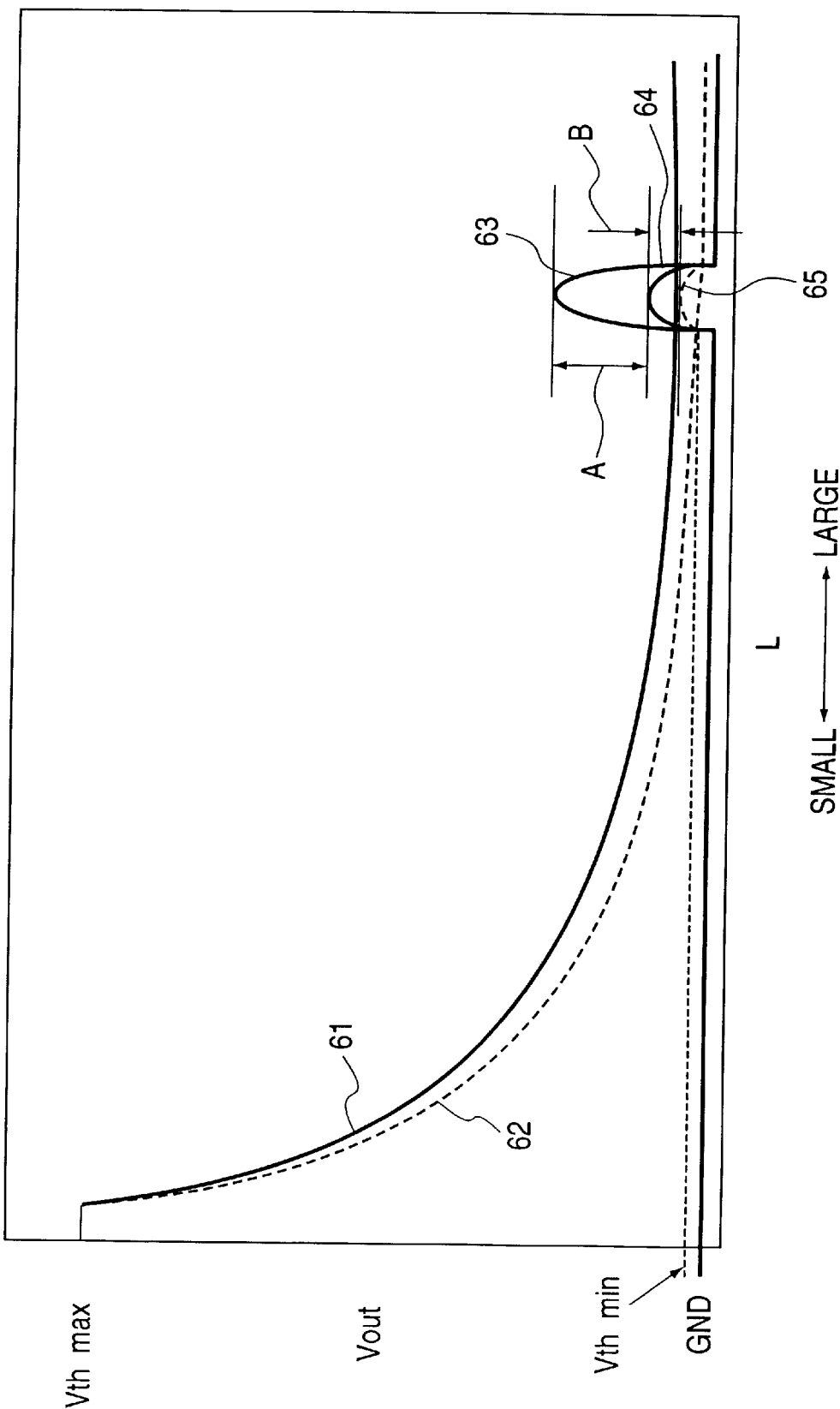
FIG. 26 is a graph illustrating a detection level process to judge whether there is an obstacle or not.

FIG. 26 is a graph showing the relationship between an output voltage Vout of the level detector 347 and the distance L between the input point on the vibration propagation plate 8 designated by the vibration input pen 205 and the vibration sensor 6. Vout attenuates as the distance L becomes long, as shown in FIG. 26. This attenuation is given by the following function.

$$\text{Vout}=(1/L)\text{Vin}\cdot m^L \tag{18}$$

wherein Vout is a dependent variable indicating an output voltage of the level detector 347. Vin is a vibration level input to the vibration propagation plate 8 from the vibration input pen 205. Although Vin changes with a load (pen pressure) applied to the pen tip 21 of the vibration input pen 205 or an input angle of the pen 205, Vin can be regarded as invariable in the above equation (18) during the process of driving the vibration input pen 205 once and calculating the coordinate value, and so it is regarded as a constant. L is the distance between the vibration input pen 205 and the vibration sensor and it is an independent constant. m is a constant which determines an attenuation coefficient and is determined by the characteristics of the vibration sensor.

The Tg circuit 244 has the threshold value 582 to be set by the above equation and can stably detect tg independently from a level change with the distance. The threshold value 582 corresponds to a curve 62 shown in FIG. 26 which changes from Vth min to Vth max corresponding to the power source voltage, relative to the distance L. Vth min has an off-set value of a predetermined level from GND level in order to take into consideration noises to be input to the processing circuits.

The detection level changes, for example, between a level 64 and a level 63 shown in FIG. 26 because of the change in the pen pressure, and has a change width A. It has been verified from experiments that attenuation of the detection level with hand-touch is about 20% of the detection level without hand-touch. In this case, the detection level 64 attenuates to a detection level 65, with a change width B. The time tg can be detected more stably as the change widths A and B become smaller.

Figure 27:
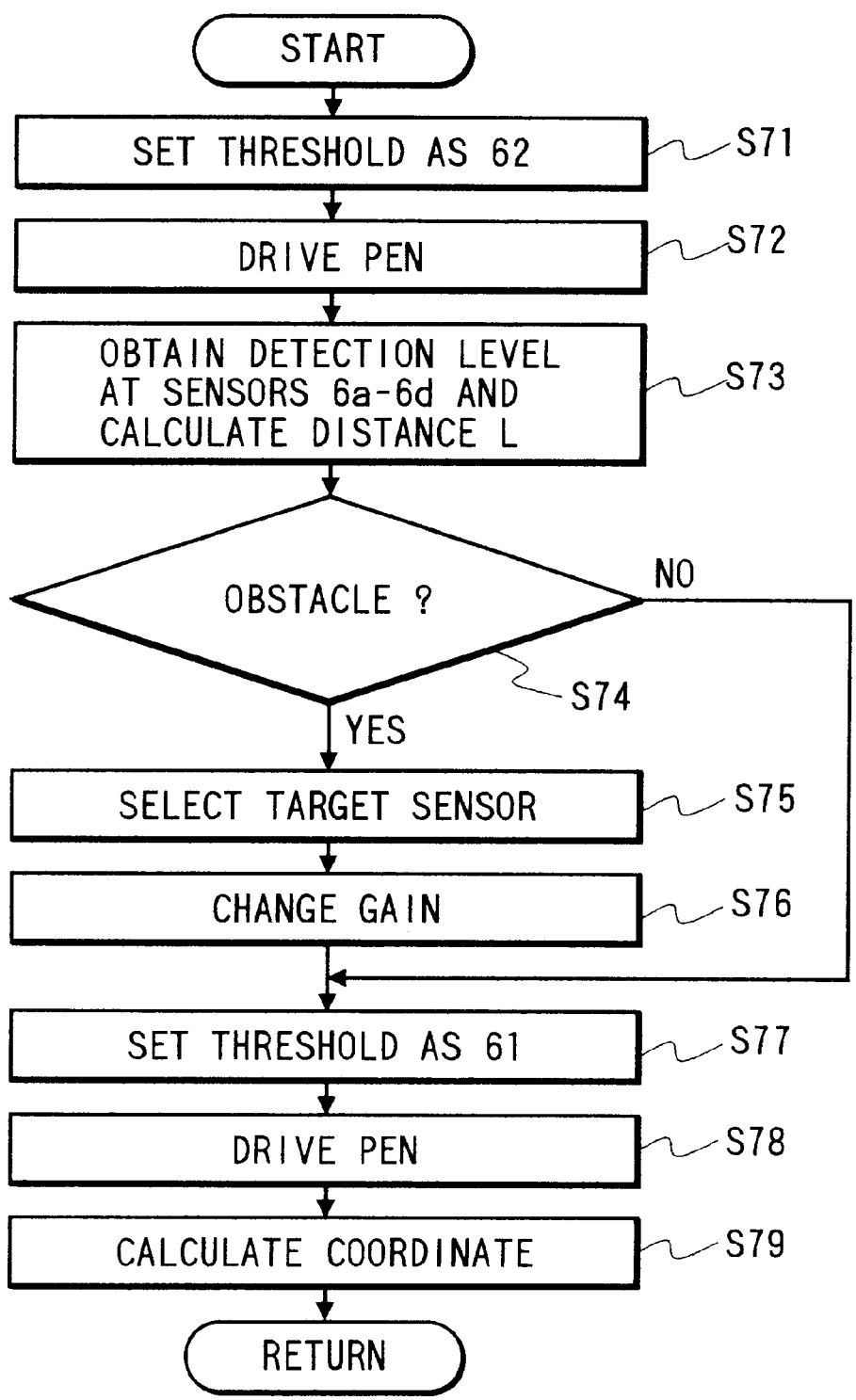
FIG. 27 is a flow chart illustrating the operation of detecting a coordinate value by a microcomputer.

In this embodiment, an obstacle is detected by the procedure illustrated in FIG. 27 to thereby remove the change width B and allow a designated point to be detected more stably.

At Step S71 shown in FIG. 27, a threshold value (1) is set to "62". At Step S72 the vibration input pen 205 is driven and at Step S73 the level detector 347 acquires the detection levels at the vibration sensors 6a to 6d to calculate the distance L to each vibration sensor.

By using the detection level and the distance L, the microcomputer 231 executes the process at Step S74 whereat Vin of the equation (18) is calculated for the vibration sensors 6a to 6d and the four values of Vin are compared with each other in order to detect any obstacle such as hand-touch on the vibration propagation plate 8. If there is no obstacle, the four values of Vin of all the vibration sensors 6a to 6d are the same. However, if there is an obstacle and the detection level attenuates, Vin of only the vibration sensor which has the obstacle on its vibration propagation path lowers.

At Step S75 the microcomputer 231 selects the vibration sensor 6 having the obstacle, and at Step S76 it supplies a signal to the variable gain setter 348, the signal indicating that the gain is to be changed to a predetermined gain. The variable gain setter 348 can change the gain, for example, to a gain compensating for an attenuation to 20% of hand-touch, by using a select signal.

After the gain is adjusted, at Step S77 the threshold value (2) is set to "61" and at Step S78 the vibration input pen 205 is driven again to calculate the coordinate values as normal values at Step S79.

The above operations illustrated by the flow chart are stored in the form of a program instruction sequence in ROM (not shown) of the microcomputer 231.

<Description of Coordinate Position Calculation (FIG. 28)>

Figure 28:
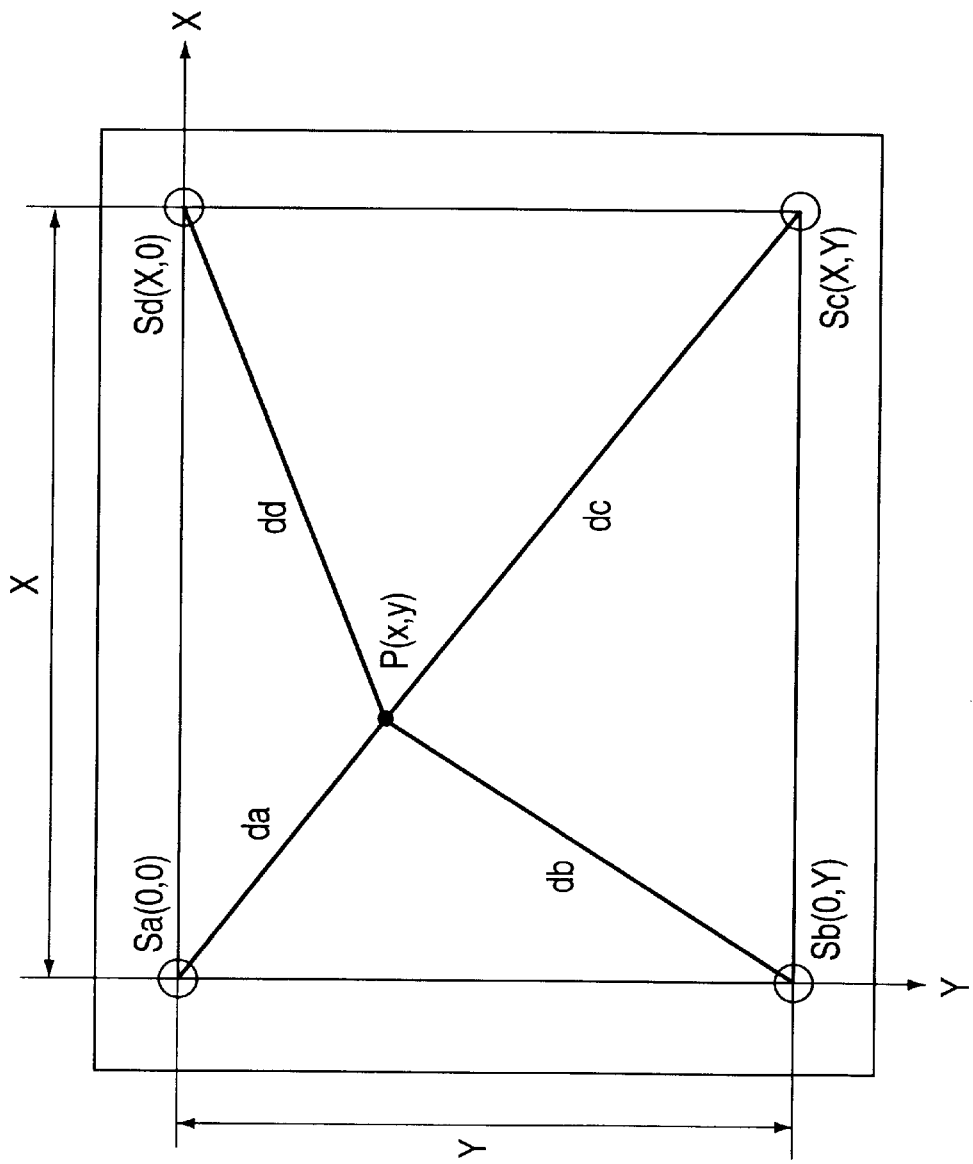
FIG. 28 is a diagram illustrating an example of coordinate position calculation.

FIG. 28 is a diagram illustrating a method of detecting a coordinate value according to the fifth embodiment. The four vibration sensors 6a to 6d are set to positions Sa to Sd near at four corners of the vibration propagation plate 8. Linear distances da to dd from the position P of the vibration input pen 205 to the vibration sensors 6a to 6d can be obtained by the method described above. The controller 1 can calculate the coordinate value (x, y) of the position P of the vibration input pen 205 by the following equations by using the distances da to dd and the pythagorean theorem.

$$x=X/2+(da+dd)\cdot(da-dd)/2X \tag{19}$$

$$y=Y/2+(da+db)\cdot(da-db)/2Y \tag{20}$$

where X and Y are the distance between vibration sensors 6a and 6d and the distance between vibration sensors 6a and 6b.

In the above manner, even if an obstacle is present on a vibration propagation path of the vibration propagation plate 8 between the vibration input pen 205 and the vibration sensor 6, stable coordinate detection can be performed in real time and an excellent coordinate input apparatus resistant against noises can be provided.

(Sixth Embodiment)

In the fifth embodiment, in accordance with the detection level and the calculated distance, an obstacle is detected. In the sixth embodiment, a pen input is performed by using a touch panel.

Figure 29:
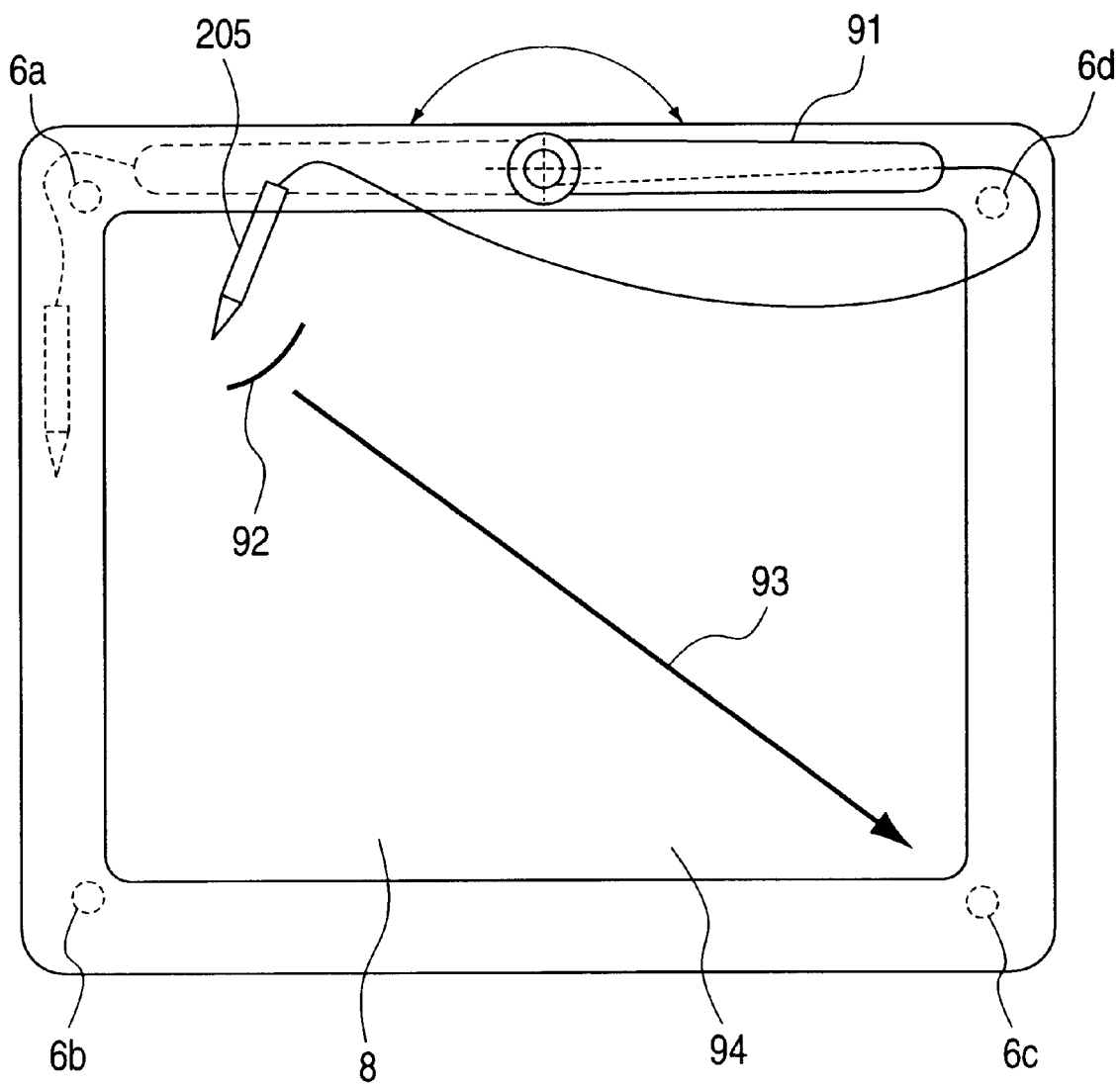
FIG. 29 is a diagram showing the outline structure of a vibration propagation plate according to a sixth embodiment of the invention.

In FIG. 29, reference numeral 91 represents an arm mounted on an upper frame. This arm 91 is structured so that the lead of the vibration input pen can be wound up into the arm. The arm 91 is made rotatable to change its output port in an opposite direction as shown by a broken line, to thereby facilitate both right- and left-handed users to use the vibration input pen 205. Reference numeral 92 represents a hand-touch area of a right-handed user, and reference numeral 93 represents a vibration propagation path with the hand-touch area 92. Reference numeral 94 represents a touch panel of a resistor film type. The touch panel 94 is mounted on the upper surface of a vibration propagation plate 8. An input of the vibration input pen 205 to the vibration propagation plate 8 is performed through the touch panel 94.

With the structure described above, whether a right- or left-handed user is judged from a rotation switch (not shown) mounted in the arm 91.

Thereafter, the vibration input pen 205 is driven and the coordinate values are calculated in the manner same as the fifth embodiment. In this case, the coordinate values on the touch panel are also detected. The microcomputer detects both the coordinate values, and if they are equal in a predetermined threshold value range, it is judged that there is an input from the vibration input pen 205 without hand-touch, and the detected coordinate values are output. If they are outside of the predetermined threshold value range, it is judged that there is a hand-touch. If the switch in the arm 91 is set to a right-handed user, the gains of the pre-amplifiers of the vibration sensors 6c and 6d are adjusted in the manner same as the fifth embodiment and the vibration input pen 205 is driven again to output coordinate values as normal coordinate values.

With the above structure, even if there is an obstacle on a vibration propagation path of the vibration propagation plate 8 between the vibration input pen 205 and the vibration sensor 6, stable coordinate detection is possible and an excellent coordinate input apparatus can be provided.

(Seventh Embodiment)

In the sixth embodiment, the switch in the arm is used for judging whether a user is right-handed or left-handed, and the pre-amplifiers whose gains are adjusted are determined irrespective of at which the vibration input pen is positioned. If such an arm is not used, the pre-amplifiers whose gains are adjusted may be determined in accordance with the coordinate values of the vibration input pen on the vibration propagation plate and the coordinate values on the touch panel.

(Eighth Embodiment)

In the fifth to seventh embodiments, after an obstacle is detected, the gain of the pre-amplifier is changed. The same effects can obviously obtained by changing the drive voltage of the vibrator driver 203 of the vibration input pen 205.

The present invention may be applied to a system constituted by a plurality of apparatuses or to a system constituted by a single apparatus. It is obvious that the invention may be embodied by supplying programs to the system or the single apparatus. In this case, a storage medium storing the programs constitutes the present invention. The system or the single apparatus reads the programs from the storage medium and runs in a predetermined manner.

As described so far, a coordinate input apparatus for calculating a coordinate position of a vibration input point in accordance with a delay time required for elastic wave vibration input from vibration input means to a vibration propagation plate to reach vibration detecting means, comprises: means for detecting an obstacle on a vibration propagation path between the vibration input means and the vibration output means; and control means for controlling the vibration input means or the vibration detecting means in accordance with a detection result by the detecting means. Accordingly, even if there is an obstacle on the vibration propagation path of the vibration propagation plate between the vibration input means and the vibration detecting means, stable coordinate detection is possible and an excellent coordinate input apparatus resistant against noises can be provided.

What is claimed is:

1. A coordinate input apparatus for obtaining an input position of vibration input from a vibration source to a vibration propagation plate in accordance with a delay time required for the vibration to reach vibration detecting means, the coordinate input apparatus comprising:

first driving means for driving the vibration source at a first drive level to generate a coordinate detection signal in accordance with a detection signal supplied from the vibration detecting means;

judging means for judging whether the detection signal detected with the vibration detecting means is larger than a first threshold value; and second driving means for driving the vibration source at a second drive level lower than the first drive level to generate the coordinate detection signal in accordance with the detection signal supplied from the vibration detecting means, if it is judged that the detection signal is larger than the first threshold value.

2. A coordinate input apparatus according to claim 1, wherein the first threshold value is a maximum signal value when the vibration source is driven at the second drive level.

3. A coordinate input apparatus according to claim 1, wherein said judging means changes the first threshold value in accordance with a lapse time after the vibration source is driven.

4. A coordinate input apparatus according to claim 1, wherein said first driving means drives the vibration source at a predetermined drive level, and amplifies the signal obtained by the vibration detecting means at a first gain to obtain the detection signal, and said second driving means drives the vibration source at a predetermined drive level, and amplifies the signal obtained by the vibration detecting means at a second gain lower than the first gain to obtain the detection signal, if it is judged that the detection signal is larger than the first threshold value.

5. A coordinate input apparatus according to claim 1, wherein if the detection signal obtained by the vibration detecting means exceeds a second threshold level, said first and second driving means use the detection signal larger than the second threshold level as the detection signal.

6. A coordinate input apparatus according to claim 5, wherein the second threshold level is set to a value lower than a maximum value of unnecessary vibration driven at the first drive level, by a ratio of the first drive level to the second drive level.

7. A coordinate input apparatus according to claim 6, wherein the first threshold value is set to generally a maximum value of the detection signal obtained at the second drive level.

8. A coordinate input apparatus according to claim 5, wherein said first and second driving means change the second threshold value in accordance with a lapse time after the vibration source is driven.

9. A coordinate input apparatus according to claim 1, further comprising changing means for changing at least two combinations of drive levels corresponding to the first and second drive levels, in accordance with a vibration arrival delay time of vibration reaching the vibration detecting means.

10. A control method for a coordinate input apparatus for obtaining an input position of vibration input from a vibration source to a vibration propagation plate in accordance with a delay time required for the vibration to reach vibration detecting means, the coordinate input apparatus comprising:

a first driving step for driving the vibration source at a first drive level to generate a coordinate detection signal in accordance with a detection signal supplied from the vibration detecting means;

a judging step for judging whether the detection signal detected with the vibration detecting means is larger than a first threshold value; and a second driving step for driving the vibration source at a second drive level lower than the first drive level to generate the coordinate detection signal in accordance with the detection signal supplied from the vibration detecting means, if it is judged that the detection signal is larger than the first threshold value.

11. A control method for a coordinate input apparatus according to claim 10, wherein the first threshold value is a maximum signal value when the vibration source is driven at the second drive level.

12. A control method for a coordinate input apparatus according to claim 10, wherein said judging step changes the first threshold value in accordance with a lapse time after the vibration source is driven.

13. A control method for a coordinate input apparatus according to claim 10, wherein said first driving step drives the vibration source at a predetermined drive level, and amplifies the signal obtained by the vibration detecting means at a first gain to obtain the detection signal, and said second driving step drives the vibration source at a predetermined drive level, and amplifies the signal obtained by the vibration detecting means at a second gain lower than the first gain to obtain the detection signal, if it is judged that the detection signal is larger than the first threshold value.

14. A control method for a coordinate input apparatus according to claim 10, wherein if the detection signal obtained by the vibration detecting means exceeds a second threshold level, said first and second driving steps use the detection signal larger than the second threshold level as the detection signal.

15. A control method for a coordinate input apparatus according to claim 14, wherein the second threshold level is set to a value lower than a maximum value of unnecessary vibration driven at the first drive level, by a ratio of the first drive level to the second drive level.

16. A control method for a coordinate input apparatus according to claim 15, wherein the first threshold value is set to generally a maximum value of the detection signal obtained at the second drive level.

17. A control method for a coordinate input apparatus according to claim 14, wherein said first and second driving steps change the second threshold value in accordance with a lapse time after the vibration source is driven.

18. A control method for a coordinate input apparatus according to claim 10, further comprising a changing step for changing at least two combinations of drive levels corresponding to the first and second drive levels, in accordance with a vibration arrival delay time of vibration reaching the vibration detecting means.

19. A storage medium storing a control program for controlling a coordinate input apparatus for obtaining an input position of vibration input from a vibration source to a vibration propagation plate in accordance with a delay time required for the vibration to reach vibration detecting means, the control program comprising:

codes for a first driving process of driving the vibration source at a first drive level to generate a coordinate detection signal in accordance with a detection signal supplied from the vibration detecting means;

codes for a judging process of judging whether the detection signal detected with the vibration detecting means is larger than a first threshold value; and codes for a second driving process of driving the vibration source at a second drive level lower than the first drive level to generate the coordinate detection signal in accordance with the detection signal supplied from the vibration detecting means, if it is judged that the detection signal is larger than the first threshold value.

20. A coordinate input apparatus comprising:

vibration generating means capable of making a vibration output level variable in accordance with a designated drive level;

detecting means including a plurality of detection units mounted on a propagation plate for detecting vibrations applied from said vibration generating means to the propagation plate;

first calculating means for calculating a position where the vibration was applied, after said vibration generating means is driven at a predetermined drive level and said detecting means detects the applied vibration;

determining means for determining a drive level for each of the plurality of detection units, in accordance with a distance between the vibration applied position calculated by said first calculating means and each of the detection units; and second calculating means for calculating the vibration applied position, after said vibration generating means is driven sequentially at a plurality of drive levels determined by said determining means to apply vibration to the propagation plate and the detection units detect corresponding vibrations at the plurality of drive levels.

21. A coordinate input apparatus according to claim 20, wherein said first calculating means calculates the vibration applied position by using the detection units smaller in number than the total number of the detection units of the detecting means.

22. A coordinate input apparatus according to claim 20, wherein said detecting means includes a detector circuit for generating a signal representative of an arrival of vibration in accordance with a vibration waveform detected by the detection unit, and connecting means for sequentially changing each connection between said detector circuit and the plurality of detection units and time divisionally assigning each detection unit with said detector circuit, in order to share said detector circuit by the plurality of detection units.

23. A coordinate input apparatus according to claim 22, wherein said second calculating means sets one of the drive levels determined by said determining means to said vibration generating means, wherein the detection unit corresponding to the set drive level is connected via said connecting means to said detector circuit and the detection units detects vibration.

24. A coordinate input apparatus according to claim 23, wherein:

said detector circuit of said detecting means detects a vibration arrival timing based on a group velocity and a vibration arrival timing based on a phase velocity, from a vibration waveform detected by each corresponding detection unit; and said first and second calculating means calculate the vibration applied position in accordance with a group delay time and a phase delay time obtained from the vibration arrival timings detected with said detecting means.

25. A coordinate input apparatus according to claim 20, further comprising output means for outputting a coordinate value of the vibration applied position calculated by said second calculating means, as a detection result.

26. A coordinate input apparatus according to claim 20, wherein said determining means determines a drive level for each detection unit such that the level of an envelope output of a vibration waveform detected by the detection unit takes generally a middle value of a power source voltage of the apparatus.

27. A coordinate input apparatus according to claim 20, wherein said determining means includes a table storing drive levels corresponding to distances from the vibration applied position to each detection unit, and determines the drive level for each detection unit by referring to the table.

28. A coordinate input apparatus comprising:

vibration generating means for generating vibration;

detecting means including a plurality of detection units mounted on a propagation plate for detecting vibrations applied from said vibration generating means to the propagation plate;

first calculating means for calculating a position where the vibration was applied, after a predetermined gain is set to each detection unit, said vibration generating means is driven to apply vibration, and said detecting means detects the applied vibration;

determining means for determining the gain for each of the plurality of detection units, in accordance with a distance between the vibration applied position calculated by said first calculating means and each of the detection units; and second calculating means for calculating the vibration applied position, after the gain determined by said determining means is set to each detection unit, said vibration generating means is driven to apply vibration, and said detecting means detects the applied vibration.

29. A coordinate input apparatus according to claim 28, wherein said first calculating means calculates the vibration applied position by using the detection units smaller in number than the total number of the detection units of the detecting means.

30. A coordinate input apparatus according to claim 28, wherein each detection unit of said detecting means is provided with a detector circuit for generating a signal representative of an arrival of vibration in accordance with a vibration waveform detected by the detection unit, and connecting means for sequentially changing each connection between said detector circuit and the plurality of detection units and time divisionally assigning each detection unit with said detector circuit.

31. A coordinate input apparatus according to claim 30, wherein:

said detector circuit of said detecting means detects a vibration arrival timing based on a group velocity and a vibration arrival timing based on a phase velocity, from a vibration waveform detected by the corresponding detection unit; and said first and second calculating means calculate the vibration applied position in accordance with a group delay time and a phase delay time obtained from the vibration arrival timings detected with said detecting means.

32. A coordinate input apparatus according to claim 28, wherein said determining means determines the gain for each detection unit such that the level of an envelope output of a vibration waveform detected by the detection unit takes generally a middle value of a power source voltage of the apparatus.

33. A coordinate input apparatus according to claim 28, wherein said determining means includes a table storing drive levels corresponding to distances from the vibration applied position to each detection unit, and determines the gain for each detection unit by referring to the table.

34. A control method for a coordinate input apparatus having vibration generating means capable of making a vibration output level variable in accordance with a designated drive level and detecting means including a plurality of detection units mounted on a propagation plate for detecting vibrations applied from said vibration generating means to the propagation plate, the control method comprising:

a first calculating step for calculating a position where the vibration was applied, after said vibration generating means is driven at a predetermined drive level and said detecting means detects the applied vibration;

a determining step for determining a drive level for each of the plurality of detection units, in accordance with a distance between the vibration applied position calculated by said first calculating step and each of the detection units; and a second calculating step for calculating the vibration applied position, after said vibration generating means is driven sequentially at a plurality of drive levels determined by said determining step to apply vibration to the propagation plate and the detection units detect corresponding vibrations at the plurality of drive levels.

35. A control method for a coordinate input apparatus according to claim 34, wherein said first calculating step calculates the vibration applied position by using the detection units smaller in number than the total number of the detection units of the detecting means.

36. A computer readable memory storing a control program for controlling a coordinate input apparatus having vibration generating means capable of making a vibration output level variable in accordance with a designated drive level and detecting means including a plurality of detection units mounted on a propagation plate for detecting vibrations applied from said vibration generating means to the propagation plate, the control program making a computer execute the functions of:

first calculating means for calculating a position where the vibration was applied, after said vibration generating means is driven at a predetermined drive level and said detecting means detects the applied vibration;

determining means for determining a drive level for each of the plurality of detection units, in accordance with a distance between the vibration applied position calculated by said first calculating means and each of the detection units; and second calculating means for calculating the vibration applied position, after said vibration generating means is driven sequentially at a plurality of drive levels determined by said determining means to apply vibration to the propagation plate and the detection units detect corresponding vibrations at the plurality of drive levels.

37. A coordinate input apparatus for calculating a coordinate position of a vibration input point in accordance with a delay time required for an elastic wave vibration input from a vibration input means to a vibration propagation plate to reach a vibration detecting means, comprising:

obstacle detecting means for detecting whether during input there is an obstacle on a vibration propagation path between the vibration input means and the vibration detecting means; and control means for changing a gain of the vibration detecting means on a basis of a detection result by said obstacle detecting means.

38. A coordinate input apparatus according to claim 37, wherein the obstacle on the vibration propagation path is detected in accordance with an attenuation of a detection level detected with said obstacle detecting means.

39. A coordinate input apparatus according to claim 37, wherein the vibration input means inputs vibration via a touch panel of a coordinate detecting type to the vibration propagation plate, and the obstacle on the vibration propagation path is detected in accordance with a difference between the coordinate value calculated from a delay time required for the elastic wave vibration to reach the vibration detecting means and the coordinate value detected with the touch panel.

40. A coordinate input apparatus for calculating a coordinate position of a vibration input point in accordance with a delay time required for an elastic wave vibration input from a vibration input means to a vibration propagation plate to reach a vibration detecting means, comprising:

obstacle detecting means for detecting whether during input there is an obstacle on a vibration propagation path between the vibration input means and the vibration output means; and control means for changing a drive voltage of the vibration input means on a basis of a detection result by said obstacle detecting means.

41. A coordinate input apparatus according to claim 40, wherein the vibration input means inputs vibration via a touch panel of a coordinate detecting type to the vibration propagation plate, and the obstacle on the vibration propagation path is detected in accordance with a difference between the coordinate value calculated from a delay time required for the elastic wave vibration to reach the vibration detecting means and the coordinate value detected with the touch panel.

42. A coordinate input apparatus according to claim 40, wherein the obstacle on the vibration propagation path is detected in accordance with an attenuation of a detection level detected with said obstacle detecting means.

* * * * *